(12) United States Patent
Monteith et al.

(10) Patent No.: US 9,244,965 B2
(45) Date of Patent: Jan. 26, 2016

(54) METHOD AND SYSTEM FOR SHARING DATA BETWEEN SOFTWARE SYSTEMS

(75) Inventors: Michael Lorne Monteith, Toronto (CA); Stephen Paul Owens, Caledon (CA)

(73) Assignee: Thoughtwire Holdings Corp., Toronto, ON (CA)

( * ) Notice: Subject to any disclaimer, the term of this patent is extended or adjusted under 35 U.S.C. 154(b) by 1048 days.

(21) Appl. No.: 12/710,099

(22) Filed: Feb. 22, 2010

(65) Prior Publication Data

US 2011/0209138 A1    Aug. 25, 2011

(51) Int. Cl.
*G06F 9/44* (2006.01)
*G06F 17/30* (2006.01)

(52) U.S. Cl.
CPC .............................. *G06F 17/30327* (2013.01)

(58) Field of Classification Search
None
See application file for complete search history.

(56) References Cited

U.S. PATENT DOCUMENTS

| | | | |
|---|---|---|---|
| 6,292,804 B1 * | 9/2001 | Ardoin et al. | 707/794 |
| 6,745,203 B1 * | 6/2004 | Garg et al. | |
| 7,526,481 B1 * | 4/2009 | Cusson et al. | |
| 7,853,618 B2 * | 12/2010 | Yuan et al. | 707/794 |
| 8,301,660 B2 * | 10/2012 | Yalamanchi | 707/783 |
| 2003/0074352 A1 * | 4/2003 | Raboczi et al. | 707/4 |
| 2003/0105746 A1 | 6/2003 | Stickler | |
| 2004/0015426 A1 | 1/2004 | Tadayon et al. | |
| 2004/0044866 A1 | 3/2004 | Casazza | |
| 2004/0148333 A1 | 7/2004 | Manion et al. | |
| 2004/0221053 A1 * | 11/2004 | Codella et al. | 709/231 |
| 2004/0243531 A1 | 12/2004 | Dean | |
| 2005/0021523 A1 | 1/2005 | Farag | |
| 2005/0044063 A1 * | 2/2005 | Barsness et al. | 707/2 |
| 2005/0060342 A1 | 3/2005 | Farag | |
| 2005/0066118 A1 | 3/2005 | Perry et al. | |
| 2006/0117073 A1 | 6/2006 | Bosworth et al. | |
| 2006/0190455 A1 | 8/2006 | Braddy et al. | |
| 2007/0022107 A1 | 1/2007 | Yuan et al. | |
| 2007/0124291 A1 | 5/2007 | Hassan et al. | |
| 2007/0277148 A1 | 11/2007 | Venolia | |
| 2008/0040308 A1 * | 2/2008 | Ranganathan et al. | 707/1 |
| 2008/0082612 A1 * | 4/2008 | Declerck | 709/206 |
| 2008/0198871 A1 | 8/2008 | Shahidi et al. | |
| 2008/0208676 A1 | 8/2008 | Williams et al. | |

(Continued)

FOREIGN PATENT DOCUMENTS

EP        2650832 A1    10/2013

OTHER PUBLICATIONS

Google, "Gadget-to-Gadget Communication (Deprecated)", http://code.google.com/apis/gadgets/docs/pubsub.html.

(Continued)

*Primary Examiner* — Umut Onat
(74) *Attorney, Agent, or Firm* — Kagan Binder, PLLC

(57) ABSTRACT

A method and system for sharing data between software systems is provided. A graph data structure is maintained in storage of a computing device. The graph data structure has data items and relationships therebetween that are semantically described. A request received from a first software system is stored. The request is for requested data that is semantically described, and an address declared by the first software system. The requested data is semantically resolved to at least one of the data items in the graph data structure. The address is called, and a value of one of the at least one data items is passed to the first software system when the value is updated.

37 Claims, 13 Drawing Sheets

(56) References Cited

U.S. PATENT DOCUMENTS

| | | | |
|---|---|---|---|
| 2008/0215580 A1* | 9/2008 | Altinel et al. | 707/5 |
| 2008/0256253 A1 | 10/2008 | Branson et al. | |
| 2008/0313296 A1 | 12/2008 | Muller | |
| 2008/0320417 A1 | 12/2008 | Begley et al. | |
| 2009/0006627 A1 | 1/2009 | Castellucci et al. | |
| 2009/0216714 A1 | 8/2009 | Gonzalez et al. | |
| 2011/0040846 A1 | 2/2011 | Weinryb et al. | |
| 2011/0131119 A1* | 6/2011 | Ernst | 705/31 |
| 2011/0209138 A1 | 8/2011 | Monteith et al. | |
| 2011/0314388 A1 | 12/2011 | Wheatley | |

OTHER PUBLICATIONS

Expressor Software, "expressor data integration products", http://www.expressor-software.com/products-overview.htm.

Search Report for corresponding UK Patent Application No. GB1404645.2, dated Sep. 26, 2014.

Search Report for corresponding UK Patent Application No. GB1404638.7, dated Sep. 22, 2014.

International Search Report and Written Opinion issued on International Application No. PCT/CA2011/050020, dated Apr. 18, 2011.

Office Action for U.S. Appl. No. 13/578,552, dated Jul. 25, 2014.

Office Action for U.S. Appl. No. 13/804,168, dated Feb. 3, 2015.

Office Action for U.S. Appl. No. 13/578,552, dated Mar. 13, 2015.

Search Report for corresponding EP Patent Application No. 14275068.6, dated Apr. 1, 2015.

\* cited by examiner

METHOD AND SYSTEM FOR SHARING DATA BETWEEN SOFTWARE SYSTEMS

FIELD OF THE INVENTION

The present invention relates generally to information systems. In particular, the invention relates to a method and system for sharing data between software systems.

BACKGROUND OF THE INVENTION

Much of what the average individual experiences as work, learning or play is accomplished through their interactions with computers and software. Billions of times a day, hundreds of millions of people interact with computers and software in their daily pursuits. Increasingly, people are faced with the challenge of working with multiple independent software systems to perform everything from the most mundane to the most complicated tasks. As used herein, "software system" refers to one or more applications, services, firmware, executed scripts, middleware, sets of functionality available via web pages, etc. that may share and/or request data. In many cases, no single software system contains all of the required information or functionality and it is often the individual's job to act as the point of connection amongst the software systems they use.

The lack of integration between most software systems means that the user is burdened with the complex, time-consuming and error-prone job of interacting with each software system individually and trying to perform a coordinated task across them. They spend valuable time copying and pasting and re-entering information, switching between the applications and individual web pages they need to use, while at the same time trying to remember the information that they obtained from one application that needs to be entered into the next.

Whether it is related to a person trying to use the Internet to research and arrange their dream vacation, an agent in a customer services department trying to resolve an issue, or a physician in an emergency ward trying to quickly access all of the information available about their patient, the problem surfaces everywhere people use software systems during their day. The effects of the problem are universal and far-reaching, negatively affecting individual productivity, costs, quality of work and satisfaction. In aggregate, the implications are staggering and represent an untapped potential source of improvement in almost every industry.

In some cases, software systems have been integrated to enable data sharing between them. System integration has traditionally been done in a point-to-point fashion using programmatic connections between the separate systems in an invocation/response pattern. Usually, the connection is made via an application programming interface ("API") exposed by one of the software systems to be integrated. As these APIs are typically software system-specific, knowledge of various APIs is generally required when integrating new software systems with others. Each software system generally has different identifiers for data items, thus requiring the integrator to have knowledge of the data items and structures for each software system that is to be interacted with. Further, the events for each integrated software system need to make sense of the data moving between integrated software systems. These events are typically custom-designed and have to correspond with events occurring in other software systems. Examples of events include the completion of a database transaction, the appearance of a file in a directory, or the appearance of a message in a queue. Each of these events may require translating into something locally meaningful for each integrated software system.

Integration systems have been developed to handle the integration between different software systems, but these integration systems can bear all the same issues as encountered when directly integrating software systems.

Point-to-point integrations can work acceptably for small numbers of software systems with relatively-simple data to be shared. Due to the complexity of such integrations, they are generally reserved for enterprise systems and performed server-side. As the interaction of each software system with each other software system is explicitly programmed, the integration of each additional software system requires significantly-increased effort. Another issue is that it is generally very difficult for a third party to enhance the integration between software systems.

Yet another issue is that data persistence is not handled very well in most integrations. During the processing of a transaction, if a software system responsible for performing a task is not present, generally the transaction will fail. In order to instill robustness into such integrated software systems, event-handling has to be added as failsafes for various scenarios, adding further to the complexity of such integrations.

Server-side integration becomes even more challenging with so many widely-separated software systems coming together only on a computing device being used by an end-user and, often, on an ad-hoc basis.

One solution proposed, and deprecated, for data sharing by Google Inc is referred to as GOOGLE® gadgets. The proposal describes a publish-subscribe framework to pass messages from one gadget to another. GOOGLE® gadgets are canned sets of functionality that can be included in a web portal, such as iGoogle. Google Inc. previously supported this functionality which would not be present in other portals. Gadgets with data to share would publish the data using a set of defined identifiers via channels, as long as the gadgets were aware that at least one other gadget was interested in the data. Gadgets interested in the data would declare their interest in knowing when the values of those data items have changed. As the data is pushed via channels at the time there is a change, however, the state of the data may be unavailable to new gadgets. Further, gadgets have to have been programmed with knowledge of the defined data identifiers. This solution is specific to GOOGLE® gadgets and is not portable to other types of software systems.

It is therefore an object of the invention to provide a novel method and system For sharing data between software systems.

SUMMARY OF THE INVENTION

In accordance with an aspect of the invention, there is provided a method for sharing data between software systems, comprising:

maintaining a graph data structure in storage of a computing device, said graph data structure having data items and relationships therebetween that are semantically described;

storing a request received from a first software system for the value of requested data that is semantically described, and an address declared by said first software system;

semantically resolving said requested data to at least one of said data items in said graph data structure; and calling said address and passing the value of said at least one data item to said first software system when the value of one of said at least one data items is updated.

The method can include receiving a value for one of the data items in the graph data structure from a second software system. Further, the calling can include updating the graph data structure with the value if the value corresponds to a current transaction, and discarding the value of the one data item if the value corresponds to an outdated transaction.

The method can include discarding the request received from the first software system if the first software system becomes inactive.

In accordance with another aspect of the invention, there is provided a computer system for sharing data between software systems, comprising:

a data sharing service executing on said computer system, said data sharing service storing a graph data structure in which data items and relationships therebetween are semantically described, said data sharing service storing a request received from a first software system for the value of requested data that is semantically described, and an address for said first software system, said data sharing service semantically resolving said requested data to at least one of said data items in said graph data structure, calling said address and passing the value of said at least one data item to said first software system when the value of one of said at least one data item is updated.

The data sharing service can include an interface for receiving a value for one of the data items in the graph data structure from a second software system. The data sharing service can update the graph data structure with the value if the value corresponds to a current transaction, and can discard the value of the one data item if the value corresponds to an outdated transaction.

The data sharing service can discard the request received from the first software system if the first software system becomes inactive.

In accordance with a further aspect of the invention, there is provided a method for sharing data between software systems, comprising:

storing values for data items received from software systems in storage, said data items and relationships therebetween being semantically described;

storing requests received from said software systems, each of said requests identifying requested data semantically and including an address;

determining which of said requests is satisfied by semantically resolving said requested data to at least one of said data items and determining if one of the values of said at least one data items has been updated; and calling, for each of said satisfied requests, said address identified in said satisfied request and passing the values of said data items to which said requested data semantically resolves.

The determining can be performed periodically.

The method can include receiving a value for one of the data items from one of the software systems. The method can include storing the value for the one data item if the value corresponds to a current transaction, and discarding the value for the one data item if the value corresponds to an outdated transaction.

The determining can be performed in response to the storing.

The method can include adding semantic information relating the data items to other data items.

In accordance with yet another aspect of the invention, there is provided a computer system for sharing data between software systems, comprising:

a data sharing service executing on said computer system, said data sharing service storing values for data items received from software systems in storage, said data items and relationships therebetween being semantically described, said data sharing service storing requests received from said software systems, each of said requests identifying requested data semantically and including an address, said data sharing service determining which of said requests is satisfied by semantically resolving said requested data to at least one of said data items and determining if one of the values of said at least one data item has been updated, and calling, for each of said satisfied requests, said address identified in said satisfied request and passing the values of said data items to which said requested data semantically resolves.

The data sharing service can determine which of the requests is satisfied periodically.

The data sharing service can include an interface for receiving a value for one of the data items from one of the software systems. The data sharing service can store the value for the one data item if the value corresponds to a current transaction, and can discard the value for the one data item if the value corresponds to an outdated transaction. The data sharing service can determine which of the requests is satisfied as a result of storing the value.

The data sharing service can add semantic information relating the data items to other data items.

In accordance with still yet another aspect of the invention, there is provided a computer-readable medium having stored thereon computer-executable instructions implementing a data sharing service when executed on a computer system, said data sharing service storing values for data items received from software systems in storage, said data items and relationships therebetween being semantically described, said data sharing service storing requests received from said software systems, each of said requests identifying requested data semantically and including an address, said data sharing service determining which of said requests is satisfied by semantically resolving said requested data to at least one of said data items and determining if one of the values of said at least one data item has been updated, and calling, for each of said satisfied requests, said address identified in said satisfied request and passing the values of said data items to which said requested data semantically resolves.

In accordance with a further aspect of the invention, there is provided a method for enabling data sharing, comprising:

making computer-executable instructions available over a network, said computer-executable instructions implementing a data sharing service when executed on a computer system, said data sharing service storing values for data items received from software systems in storage, said data items and relationships therebetween being semantically described, said data sharing service storing requests received from said software systems, each of said requests identifying requested data semantically and including an address, said data sharing service determining which of said requests is satisfied by semantically resolving said requested data to at least one of said data items and determining if one of the values of said at least one data item has been updated, and calling, for each of said satisfied requests, said address identified in said satisfied request and passing the values of said data items to which said requested data semantically resolves.

BRIEF DESCRIPTION OF THE DRAWINGS

Embodiments will now be described, by way of example only, with reference to the attached Figures, wherein.

DETAILED DESCRIPTION OF THE EMBODIMENTS

In contrast to the previous practice, the invention provides a new method and system for sharing data between software systems using generally persistent information with shared semantics, instead of point-to-point integration. Software systems share semantically-identified data and request data that they need based on the semantics of that data to a stateful data sharing service. The stateful data sharing service provides software systems data shared by other software systems that semantically matches what they requested when the data is updated.

This approach facilitates scaling to accommodate a large number and range of software systems. Using the invention, many software systems can participate without constantly increasing integration complexity and without privileged access to the server infrastructure since integration is done on behalf of, and for the context of, the user. Instead, all of the software systems contribute to the shared data set in a way that enriches the available data for all software systems.

As the integration is not point-to-point and provides persistence of shared data after it is provided, it allows more than two software systems to asynchronously share data. Both the shared data and the shared semantics can be made persistent and externalized from the software systems. This combination of data and semantics can be valuable independent of any of the software systems. Network effects have long been recognized in connected software systems, a network effect occurring when the value of the system as a whole can go up quickly as a result of the number of connected software systems. The data sharing method and system of the invention exhibit network effects as the number of software systems and the quantity of shared data increase. Multiple software systems can be simultaneously working with the same shared data and can act to increase the value of the total shared data across the system. The system orchestrates transactions by simply receiving requests for data, and responding to the requests when values for data items that semantically match the requested data are available, making such transactions data-driven.

As an example, if software system 1 requires both value A and value B to do its job, then software system 2 could contribute value A and software system 3 could contribute value B. As far as software system 1 is concerned, it would get the information it needs and wouldn't even be aware that multiple software systems were participating. In addition, it would not matter when the information was provided by the first two software systems as long as software system 1 was able to receive values A and B on or after when they became available. That is, software systems 2 and 3 may very well have ceased participating but the information they provided can be made persistent and can be used to fulfill future queries.

Figure 1:
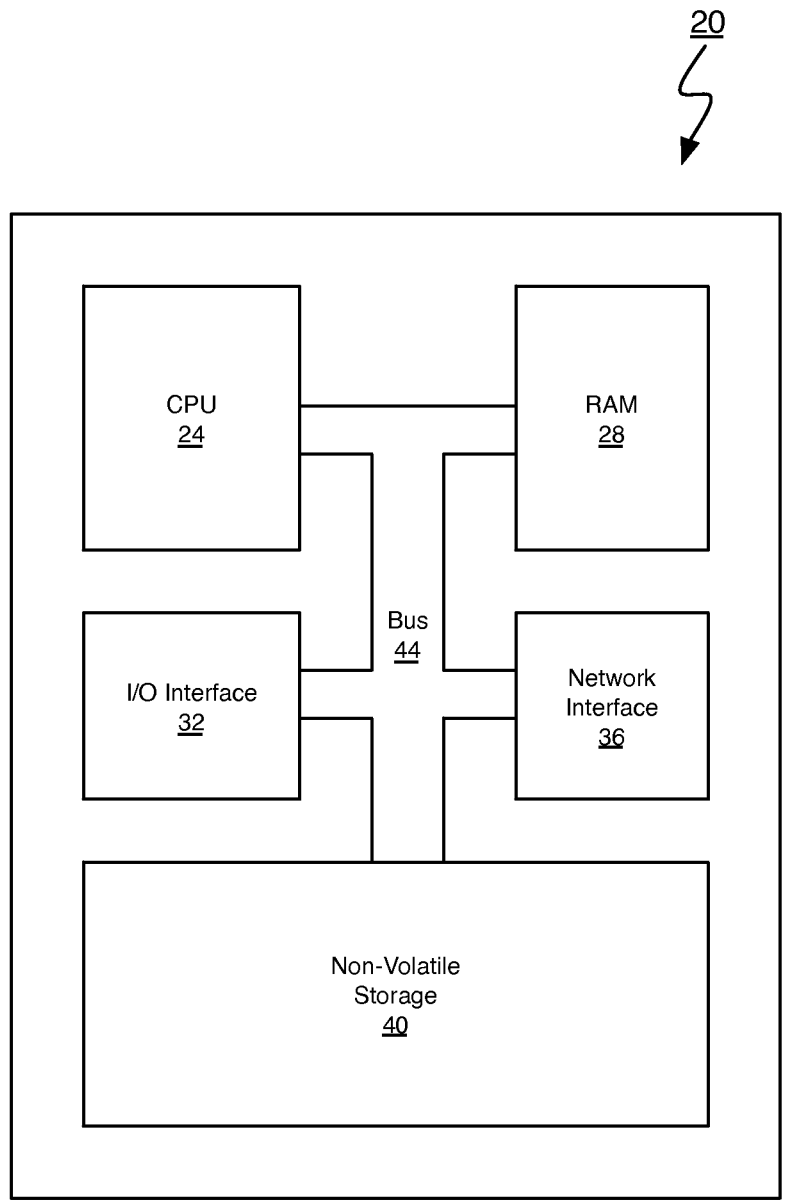
FIG. 1 shows a high-level architecture of a computer system for sharing data in accordance with an embodiment of the invention.

FIG. 1 is a high-level architectural diagram of a computer system 20 for sharing data, in accordance with an embodiment of the invention. As shown, the computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system, a stateful data sharing service and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs, including computer-executable instructions for implementing the stateful data sharing service, and the stateful data sharing service's data. During operation of the computer system 20, the operating system, the programs and the data may be retrieved from the non-volatile storage 40 and placed in RAM 28 to facilitate execution.

Figure 2:
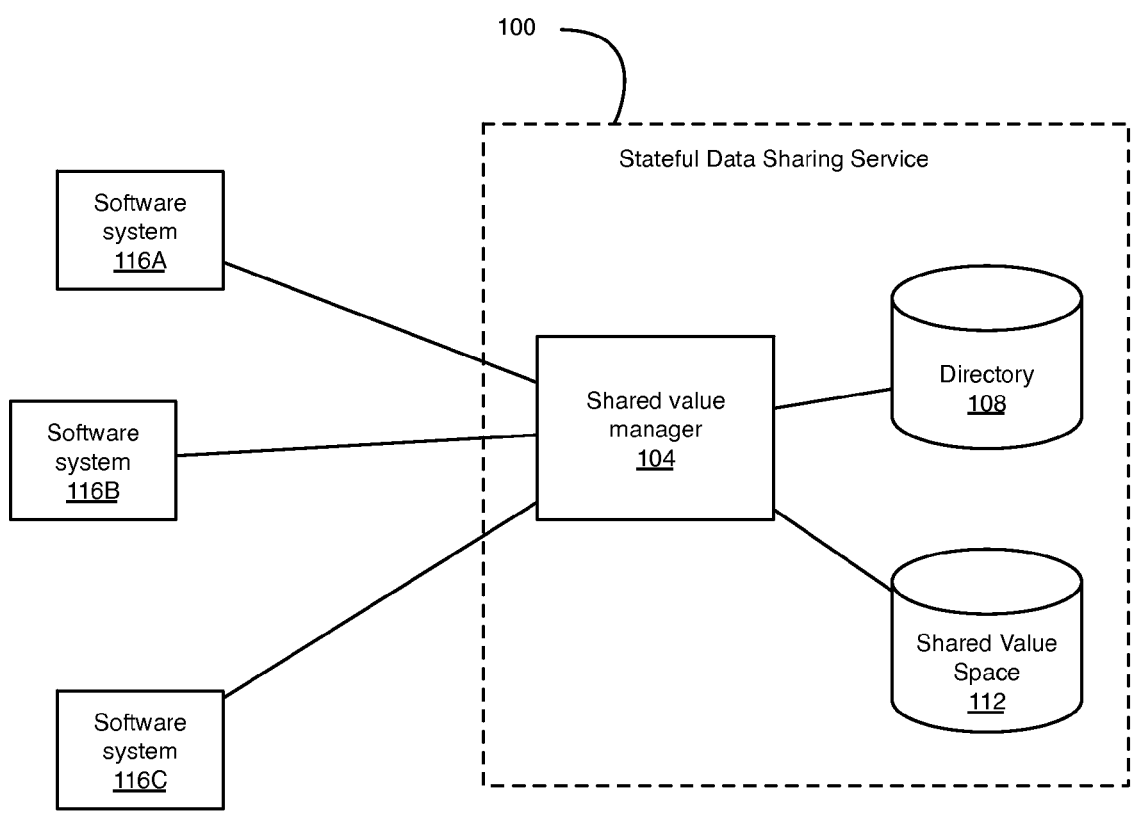
FIG. 2 shows a schematic diagram of components of a stateful data sharing service and other applications executing on the computer system of FIG. 1.

FIG. 2 shows the main components of the stateful data sharing service 100, namely a shared value manager 104, a directory 108 and a shared value space 112, as well as a number of connected software systems 116. The stateful data sharing service 100 is a JAVA® programming language application that is executed at startup of the computer system 20. The software systems 116 are the participants in this data sharing system that share and/or consume data items. Each software system 116 is an instance of a software system type. For example, a software system type can be an application that can be downloaded from a server on the Internet that is programmed to share and/or consume certain data items. In this example, a software system would be an executing instance of the application. Each software system type can share N data items and consume M data items. There is no required correlation between the data items shared and the data items consumed and either value may be zero, which would mean that the software system type only consumes or only shares. The software systems 116 need not have any knowledge of what the other software systems 116 share or consume, nor the existence of the other software systems 116.

Further, the software systems 116 may share and consume data with other software systems 116 that may or may not be active.

The shared value manager 104 is in communication with a number of software systems 116 that supply and request data via an interface that the shared value manager 104 provides. In particular, the interface is a web interface for receiving communications in the form of hypertext transfer protocol ("HTTP") requests. HTTP is the protocol used by web browsers to retrieve web pages from web servers. The shared value manager 104 manages the shared data set as it is published (that is, shared by software systems 116) and then subsequently provided to other software systems 116, or "consumed". The shared value manager 104 includes a query evaluator that evaluates whether data requests referred to as "standing queries" received from the software systems 116 are satisfied. In particular, the query evaluator includes a reasoner module that semantically resolves the data requested in the standing queries to data items for which values have been received, if possible. The reasoner module does this by computing inferences between the semantic description of the requested data and the semantic description of the data items in the shared value space 112. It will be appreciated that, in some cases, the reasoner module will be unable to resolve the requested data to data items in the shared value space 112. For example, the requested data may not yet be available as a particular software system type having data items to which the requested data semantically resolves may not have registered yet, or the requested data may simply not match any of the data items defined in the graph data structures definitions for software system types in the directory 108. The query evaluator then determines if values for the matched data items have been received by checking the shared value space 112. The particular query evaluator implemented in this embodiment is from Jena, an open source JAVA® framework for building semantic web applications. Pellet has been used for implementing the reasoner module.

The directory 108 can store persistent graph data structure definitions. Each graph data structure definition represents a particular software system type and its intent to share, at some point, data item values of the types defined therein. The graph data structure definitions semantically define the data items and the relationships therebetween. The graph data structure definitions are generated using Resource Description Framework ("RDF"), a metadata data model that is defined via a family of World Wide Web Consortium ("W3C") specifications for modeling information conceptually. The graph data structure definitions provide sufficient semantics about the data items and the software systems 116 to permit useful matching and discovery of the data items shared by the software system types by the reasoner module of the shared value manager 104. In addition, the directory 108 can store one or more standing queries defined for each software system type. The standing queries are written in the SPARQL Protocol and RDF Query Language ("SPARQL") that is another W3C specification for querying information semantically. The directory 108 is generally populated with graph data structure definitions and standing queries for software system types that are expected to share data via the stateful data sharing service 100 prior to deployment. The directory 108 is stored in non-volatile storage 40 and can be copied to RAM 28 during operation of the stateful data sharing service 100 to facilitate access.

The data items have unique identifiers that are associated in the directory 108 with the formal semantic description of the data that can be used to automate processing for data matching and transformation. Each data item identifier is unique across the set of shared data. Uniqueness of the identifiers can be provided by using a standard like uniform resource identifiers ("URIs") to define the identifiers within a scope owned by the author of the software system 116, for example the domain name system ("DNS") name of the company that authored the component could be used to scope the identifier to that company with a suffix identifying the particular data item being shared. Uniqueness across all the software systems 116 enables each use of that data item identifier to reliably identify a data item with the same characteristics. In simple terms, if software system A publishes a data item with an identifier of http://example.com/2010/C1 and software system B wants to consume data with a semantic description matching that of the data item, it can count on the fact that the data item with the identifier http://example.com/2010/C1 from software system A is the expected data.

The shared value space 112 is a persistent store where data items and their associated values that are received from the software systems 116 are stored by the shared value manager 104. In addition, the shared value manager 104 stores consume requests received from the software systems 116 in the shared value space 112. Each consume request includes a standing query for the value(s) of requested data that may semantically resolve to one or more data items, when available, along with an associated address that can be used to pass values of shared data items to the software system 116. The shared value manager 104 copies the graph data structure definitions for the software system types corresponding to software systems 116 that are currently registered (i.e., active) to the shared value space 112, and thus semantic matching is only performed for data items that may have been shared by software systems 116 currently registered. The shared value space 112 is stored in non-volatile storage 40 and can be copied to RAM 28 during operation of the stateful data sharing service 100 to facilitate access.

The stateful data sharing service 100 can ensure that the software systems 116 share according to an established set of rules. For example, the shared value manager 104 ensures that each shared data item is properly identified so that its semantics can always be determined. Semantic descriptions allow the stateful data sharing service 100 to define and then process non-explicit relationships between the shared data. Semantics enable, for example, two different properties like "YearsOld" and "Age" to be equated; even something this simple can require extensive rework without semantic descriptions, especially over a large number of software systems. As information is changed in the shared data set stored in the shared value space 112, the software system 116 may be informed by the shared value manager 116 of the changes so they can respond to the current information state.

The description of the data items and the software systems 116 that share or consume them enables the software systems 116 to declare their shared and consumed items in a manner that is independent of their internal representation and allows them to be unambiguously identified. The use of semantics allows the shared value manager 104 to properly determine the relationships between data items and software systems 116 without point-to-point connections established by the software systems themselves.

When the software systems 116 wish to share data with and receive data from the instantiated graph data structures storing the shared data in the shared value space 112, they submit a registration request to the shared value manager 104. The registration request identifies the sender's software system type. In addition, the registration request can include a description of the data being shared, and one or more consume requests. As previously noted, each consume request includes a standing query for requested data that may semantically resolve to one or more data items, along with an address associated with the standing query that enables passing values for shared data items to the particular instance of the software system. The address identifies the means by which the software systems 116 should be provided values for the requested data. Exemplary addresses can include, for example, the address of a JavaScript function or a uniform resource locator ("URL") for a web service endpoint. The shared value manager 104 monitors changes in the values of the data items that are shared by the software systems 116. Upon detecting a change/update to the value of a data item, the shared value manager 104 determines which registered consume requests are satisfied. Consume requests are satisfied if the query evaluator can find values in the shared value space 112 for each data item semantically matched to data requested in the included standing query; that is, if the standing query returns results. For each standing query that returns results, the shared value manager 104 makes a call to the address declared by the software system 116 in the corresponding consume request, and passes the data item values to the software system 116 with the call. Thus, by storing consume requests that include standing queries and a method (i.e., the address) for the shared value manager 104 to notify the software systems 116 of the results of the standing queries, once available, the stateful data sharing service 100 can enable asynchronous data sharing.

Figure 3:
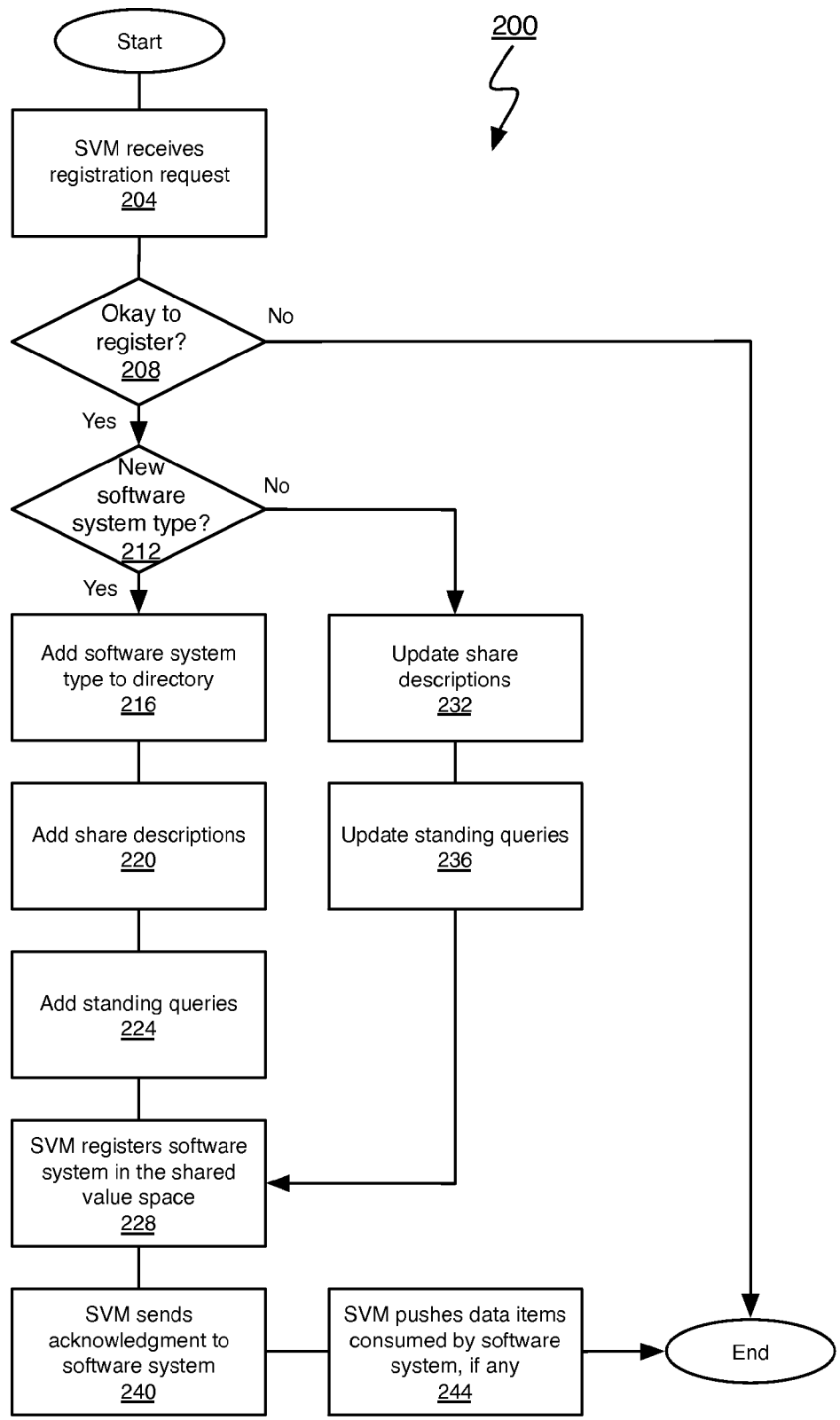
FIG. 3 shows the general method of registering software systems by the stateful data sharing service of FIG. 2.

The general method used by the stateful data sharing service 100 to register software systems 116 to enable them to participate in data sharing will now be described with reference to FIGS. 2 and 3. In the method, generally identified at 200, the shared value manager 104 receives a registration request from a software system 116 and determines whether the software system 116 corresponds to a software system type expected; that is, a software system type previously defined in the directory 108. Depending on whether the software system 116 is recognized, the shared value manager 104 either updates the information in the directory 108 for the particular software system type based on the registration request, or creates a new software system type in the directory 108 and adds the information provided in the registration request. The share value manager 104 then instantiates the graph data structure definition in the directory 108 in the shared value space 112 for the software system 116. In addition, the shared value manager 104 adds the consume requests provided with the registration request.

The method commences with the receipt of a registration request by the shared value manager 104 (204). Software systems 116 can be configured to generate a registration request upon initialization or at other times. The registration request is in the form of an HTTP request. The registration request includes a participant identification that identifies the type of the software system 116 that generated the registration request. The participant identification is in the form of a URI and is set by the author of the software system type. In one model for participant identification, the participant identification includes the DNS name of the company that created them to ensure uniqueness. For example, a software system type's participant identification could be "http://example-.com/twid/2010/02/client1". The registration request may also include one or more share descriptions and/or consume requests. The share descriptions take the form of a set of "triples" that define the data items to be shared. Each triple defines a relationship between a previously-defined node and another node, thereby forming a graph data structure definition. For example, where a software system type shares a single value, a first triple can define a first share type for the software system type, and a second triple can define that the first share type includes a value.

Upon receipt of a registration request, the shared value manager 104 determines if the registration request is okay to register (208). This decision can, for example, be based on security constraints limiting registrations to come from a known source. If the shared value manager 104 determines that the registration request should not be accepted, the method 200 ends.

If, instead, the shared value manager 104 determines that the registration request should be accepted, the shared value manager 104 determines if the registration request identifies a known software system type or a new software system type (212). In particular, the shared value manager 104 compares the participant identification URI in the registration request to those of registered software system types stored in the directory 108. If the participant identification URI does not match one for a registered software system type, the shared value manager 104 adds the software system type to the directory 108 (216). In addition, the shared value manager 104 adds any share descriptions provided with the registration request to the directory 108 (220). The shared value manager 104 processes each triple to build a graph data structure definition that is stored in the directory 108. Next, the shared value manager 104 adds any consume requests included with the registration request (224). In particular, the shared value manager 104 adds the standing queries identified the consume requests, if any, to the directory 108. Upon adding all the appropriate entries to the directory 108, the shared value manager 104 registers the software system 116 in the shared value space (228). The shared value manager instantiates the graph data structure definition from the directory 108 in the shared value space 112 in preparation for receiving values from the software system 116. In addition, the shared value manager 104 adds any consume requests provided with the registration request in their entirety to the shared value space 112.

If, instead, the shared value manager 104 determines at 212 that the participant identification URI provided in the registration request matches one for a software system type stored in the directory 108, the shared value manager 104 updates the share descriptions in the directory 108 for any provided with the registration request (232). In doing so, the shared value manager 104 may add or remove nodes (that is, data items) from the graph data structure definition stored in the directory 108 for the software system type. Then, the shared value manager 104 updates the standing queries for the software system type in the directory 108 for those included in any consume requests that accompany the registration request (236). In doing so, the shared value manager 104 may add or remove standing queries stored in the directory 108 for the software system type. Upon updating the directory 108, the method proceeds to 228, at which point the shared value manager 104 registers the software system 116, and any consume requests provided with the registration request, in the shared value space 112.

After registration of the software system 116 in the shared value space 112 at 228, the shared value manager 104 sends an acknowledgement to the software system 116 (240). The acknowledgement is accompanied by a token that identifies the particular instance of the software system type in the shared value space 112 that is generated by the shared value manager 104. By assigning unique identifiers for each instance of the software system types, the shared value manager 104 can allow multiple instances of the same software system type (for example, many instances of the same application) to share and receive data. The shared value manager 104 then pushes the value of data items consumed, if any, by the software system 116 (244). The shared value manager 104 examines the registered consume requests for the software system 116 in the shared value space 112 and determines if any are satisfied. If a consume request is satisfied, the shared value manager 104 calls the address in the consume request and passes the values for data items that semantically match the data requested in the standing query to the software system 116, as well as a version identification for those values, discussed hereinbelow.

Once the shared value manager 104 has fulfilled any satisfied consume requests for the newly-registered software system 116, the method 200 of registering the software system 116 is complete.

After a software system 116 has registered, it may share data with the stateful data sharing service 100. The data to be shared may be generated by the software system 116 independent of the stateful data sharing service 100 as part of a new transaction, or may be generated in response to receiving data from the stateful data sharing service 100 and form part of that existing transaction.

Transactions are sets of one or more logically-related operations performed on data. One or more software systems 116 can cooperatively perform the operations without knowledge of each other's existence or functions. When a set of data item values that was independently generated is shared via the stateful data sharing service 100, it is referred to as the root of a transaction and is assigned a new transaction version identification. As any of the root set of data item values is used by other software systems 116 to generate values for additional data items, those data item values form part of the same transaction and are assigned the same version identification. Software systems 116 receive the current transaction version identification when they are notified with values matching their consume requests and use this transaction version information to properly coordinate their participation across multiple transactions. The shared value manager 104 ensures that properly implemented software systems 116 produce the expected results. In this manner, the stateful data sharing service 100 tracks and segregates values for separate transactions, ensuring that the values for separate transactions are not mixed.

The shared value manager 104 orchestrates the transactions by simply receiving requests for data, and responding to the requests when values for data items that semantically match the requested data are available. The declarations of share definitions and consume requests by the software systems 116 enable such transactions to be data-driven.

The method of receiving and providing shared data item values by the stateful data sharing service 100 will now be described with reference to FIGS. 1 to 5.

Figure 4:
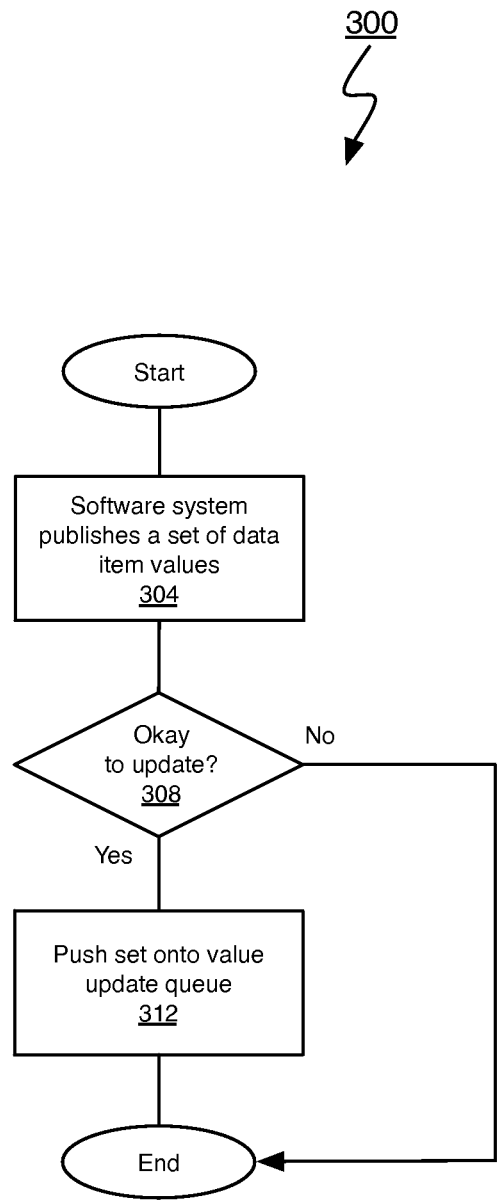
FIG. 4 shows the general method of processing incoming data item values from software systems by the stateful data sharing service of FIG. 2.

FIG. 4 shows the method of pre-processing data items shared by a software system 116 generally at 300. The method 300 commences with a software system 116 publishing a value of one or more data items (304). The software system 116 provides the following as parameters of an HTTP request to the stateful data sharing service 100: the URI identifying the particular instance of the software system type of the software system 116, a data item identifier URI for each data item identifying what is being shared, value(s) for the shared data items, and a version identification for the set of data item value(s), if any, used to generate the data item value being published. Thus, if a software system 116 generates one or more data item values based on data item values previously received from the shared value manager 104 (i.e., that form part of the same transaction), the shared value manager 104 can, upon receipt of the published set of updated data item values from the software system 116, determine if the values relied upon in generating the set of data item values published are still valid. That is, the shared value manager 104 determines if a set of data item values received correspond to an outdated or current transaction. The shared value manager 104, upon receipt of the set of shared data item values, determines if it is okay to update the shared value space 112 for the set of shared data item values (308). In particular, the shared value manager 104 compares the data items published to the share definitions stored in the directory 108 for the software system type of the software system 116 that published the data item values. If any data item published does not correspond to share definitions stored in the directory 108 for the particular software system type, the shared value manager 104 discards the published set of data item values and the method 300 ends.

If, instead, the set of data items published correspond to share definitions stored in the directory 108 for the particular software system type, the shared value manager 104 pushes the published set of data item values onto a value update queue that it maintains (312). The shared value manager 104 also includes any version identification received with the data item values. After placement of the set of data item values in the value update queue, the method 300 ends.

The shared value manager 104 then processes the sets of data item values in the value update queue. In some cases, a software system 116 may generate and publish a set of data item values in response to receiving a set of data item values from the shared value manager 104 corresponding to one of its consume requests. The shared value manager 104, however, may know that the values used by the software system 116 are obsolete due to a subsequent update in the shared value space 112. In this case, the shared value manager 104 discards the set of data item values received from the software system 116 as it knows they may no longer be valid. To this end, the shared value manager 104 maintains version information for the values of the data items stored in the shared value space 112. In particular, the shared value manager 104 assigns a unique version identification to each set of data item values that form part of a transaction.

Figure 5:
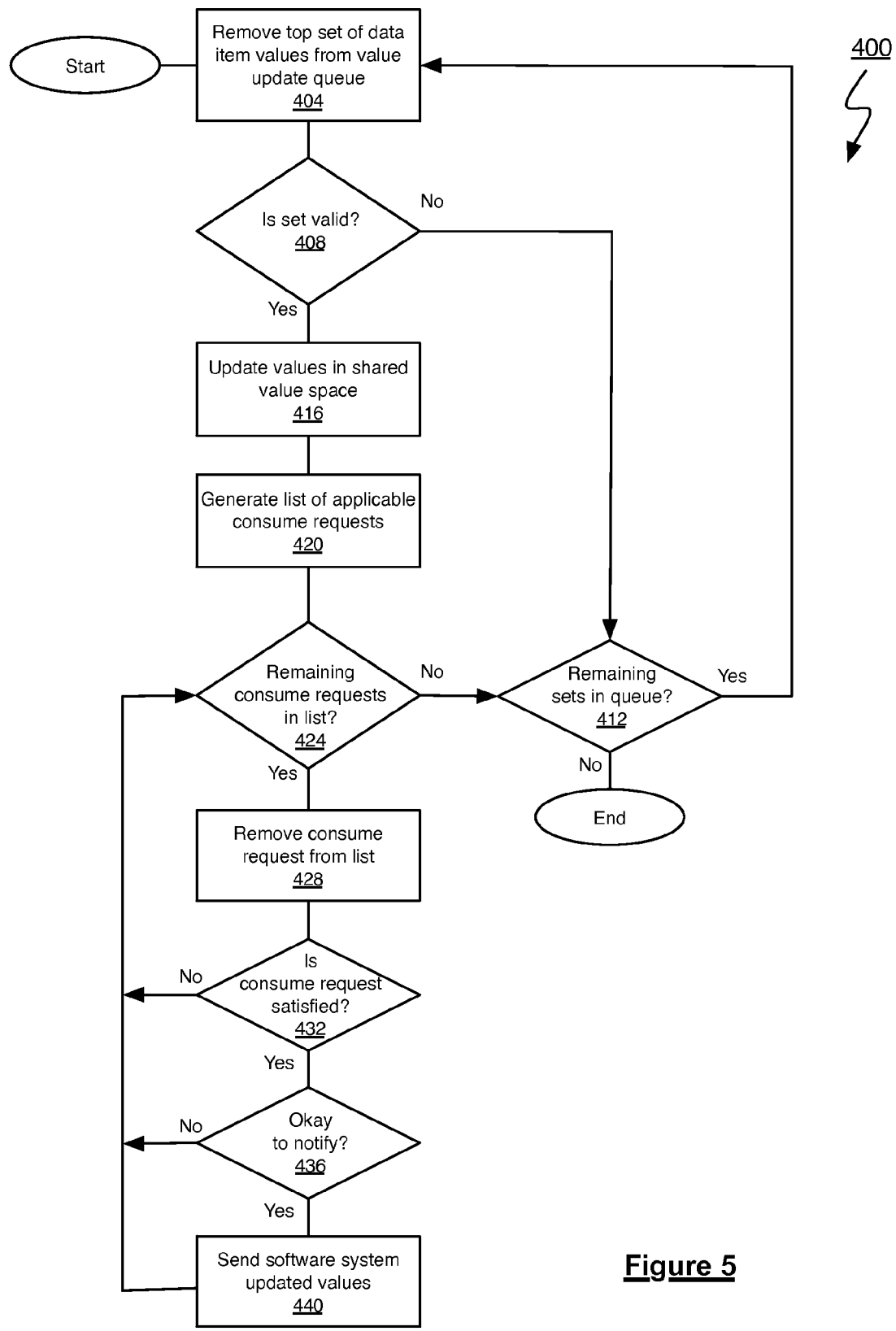
FIG. 5 shows the general method of processing data item values received from software systems by the stateful data sharing service of FIG. 2.

FIG. 5 shows the method of processing sets of data item values in the value update queue generally at 400. This method 400 is executed whenever the value update queue has at least one set of data item values for updating in it. The method 400 begins with the removal of a set of data item values from the value update queue (404). The shared value manager 104 generally processes sets of data item values in the order that they are received. The set of data item values may be accompanied by a version identification for the transaction to which the data item values belong. The shared value manager 104 then determines if the data item values in the set removed from the value update queue are valid (408). If the set of data item values removed from the value update queue was not accompanied by a version identification, the set of data item values are taken to begin a new transaction and are deemed to be valid by the shared value manager 104. If the set of data item values removed from the value update queue were accompanied by a version identification, the shared value manager 104 examines the version identification to determine if it is still current. That is, the shared value manager 104 determines if the set of data item values put into the value update queue correspond to an outdated or current transaction. If the shared value manager 104 determines that the accompanying version identification is current, the data item values in the set removed from the value update queue are deemed to be valid. If, however, the shared value manager 104 determines that the accompanying version identification is not current, the set of data item values removed from the value update queue is discarded, and the shared value manager 104 determines if there are remaining sets of data item values left in the value update queue (412). If there are remaining sets of data item values in the value update queue, the method returns to 404, at which another set of data item values is removed from the value update queue. If, instead, there are no remaining sets of data item values in the value update queue, the method 400 ends.

If the set of data item values removed from the value update queue are determined to be valid (i.e., part of the current transaction or a new transaction) by the shared value manager 104 at 408, the shared value manager 104 updates the set of data item values in the shared value space 112 (416). If the set of data item values does not have a version identification, then the shared value manager 104 also generates a new unique version identification for the set of data item values placed in the shared value space 112.

Once the shared value manager 104 has updated the shared value space 112 for the new data item values, the shared value manager 104 generates a list of registered consume requests that might include the updated data items (420). In the default configuration, the shared value manager 104 places all consume requests in this list as, in many scenarios, it can be less processor-intensive to process all consume requests rather than determine which are applicable. The shared value manager 104 only reviews consume requests in the shared value space 112; that is, registered consume requests for software systems 116 that are believed to be active. The list of consume requests generated at 420 may be empty or may include one or more consume requests. The shared value manager 104 then determines if there are any remaining consume requests in the list (424). If there are no remaining consume requests for the data item values updated, then the updating of the data item values is complete and the shared value manager 104 determines if there are remaining sets of data item values in the value update queue at 412.

If, instead, there are remaining consume requests in the list generated at 420, then the shared value manager 104 removes a consume request from the list (428). The shared value manager 104 determines if the consume request removed from the list is satisfied (432). As previously noted, consume requests are satisfied if the query evaluator can semantically resolve the data requested in the included standing query to data item values in the shared value space 112 using the semantic descriptors for those data items; that is, if the standing query returns results. If the consume request is not satisfied, the shared value manager 104 determines if there are remaining consume requests in the list at 424. If the consume request is satisfied, the shared value manager 104 determines if it is okay to notify the software system 116 associated with the consume request (436). In some cases, it can be specified that certain data items are only shared with certain software systems 116 and/or software system types. If the shared value manager 104 determines that it is not okay to notify the software system 116, the shared value manager 104 determines if there are remaining consume requests in the list at 424. If the shared value manager 104 determines, instead, that it is okay to notify the software system, the shared value manager 104 sends the software system 116 the results of the consume request (440). The shared value manager 104 calls the address identified in the consume request, passing the results to the software system 116 as parameters of the call. The software system 116 uses the information it receives from the shared value manager 104 in the function call to determine what action(s) to perform. For example, the software system 116 can update displayed information, perform calculations, store the returned data item values, etc. in response to receiving new information. After the results are provided to the software system 116, the shared value manager 104 determines if there are remaining consume requests in the list at 424. Once the shared value manager 104 determines that there are no remaining consume requests in the list at 424, the method 400 proceeds to 412, where the shared value manager 104 determines if there are remaining sets of data item values to be updated in the value update queue.

It is undesirable to process consume requests for software systems 116 that are no longer active. In order to ensure that the shared value manager 104 only processes consume requests for active software systems 116 in the shared value space 112, standing queries for inactive software systems 116 are removed from the shared value space 112. When a software system 116 is becoming inactive (i.e., shutting down), the software system 116 transmits a "deregister" notification with its unique identifier to the shared value manager 104. In response, the shared value manager 104 notes the deregistration of the software system 116 and removes the consume requests of the software system 116 from the shared value space 112. Additionally, the shared value manager 104 sends activity confirmation requests to the registered software systems 116 periodically to ensure that they are still active. The shared value manager 104 maintains the values in the shared value space 112 provided by a software system 116 that deregisters, unless directed otherwise by the software system 116.

In order to illustrate the function of the computer system 20 for sharing data, it will now be described with respect to an exemplary scenario with back reference to FIGS. 1 to 5.

Figure 6:
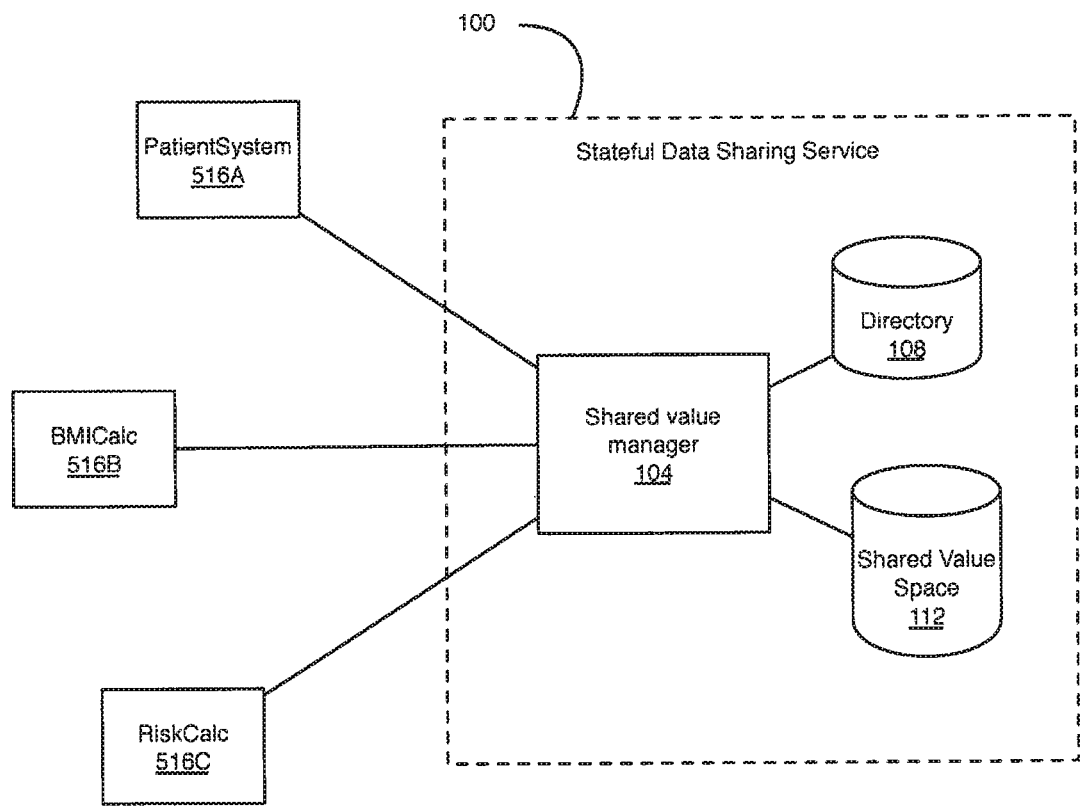
FIG. 6 shows a PatientSystem software system, a BMICalc software system, a RiskCalc software system and the stateful data sharing service of FIG. 2 in an exemplary scenario.

An exemplary configuration of the computer system 20 for a doctor's office is shown in FIG. 6. Three different software systems on the computer system 20 interact to collectively provide a solution. A first software system 516A, referred to as "PatientSystem", stores basic data for patients at the doctor's office. The basic data stored for each patient includes a patient identifier, the patient's date of birth, gender, weight and height. PatientSystem 516A uses the patient's date of birth to calculate an age for the patient. PatientSystem 516A, however, does not include the functionality required to calculate a body mass index ("BMI") and a risk factor for the patient based on the patient's age, weight, height, and gender, yet would like these values to present to a user with the other data.

A second software system 516B, referred to as "BMICalc", takes a weight and height of a person and calculates a BMI value. This software system is made available from a web site outside of the medical facility. It provides the basic BMI calculation as well as displaying up-to-date graphs showing where the calculated BMI fits within the overall population distribution. The stateful data sharing service facilitates integration with the third-party BMI calculator. Information privacy is preserved because only anonymous information (i.e., weight and height) is exchanged and BMICalc 516B is integrated with PatientSystem 516A without access to the medical facilities server information, unlike a server-side integration solution.

A third software system 516C, referred to as "RiskCalc", takes a person's gender, age and BMI and calculates a risk factor, "Risk". Like BMICalc 516B, this software system is made available from a web site outside of the medical facility. RiskCalc 516C is a very simple, rules-based expert system that has no user interaction or interface. It is specialized for calculating a risk assessment based on a few anonymous data points; that is, age, gender and BMI. Like BMICalc 516B, RiskCalc 516C only requires anonymous information in order to perform its function.

Each of PatientSystem 516A, BMICalc 516B and Risk-Calc 516C are defined software system types in the directory 108. None of the software systems 516A, 516B and 516C have knowledge of each other, nor the functions that the other software systems provide.

Figure 7:
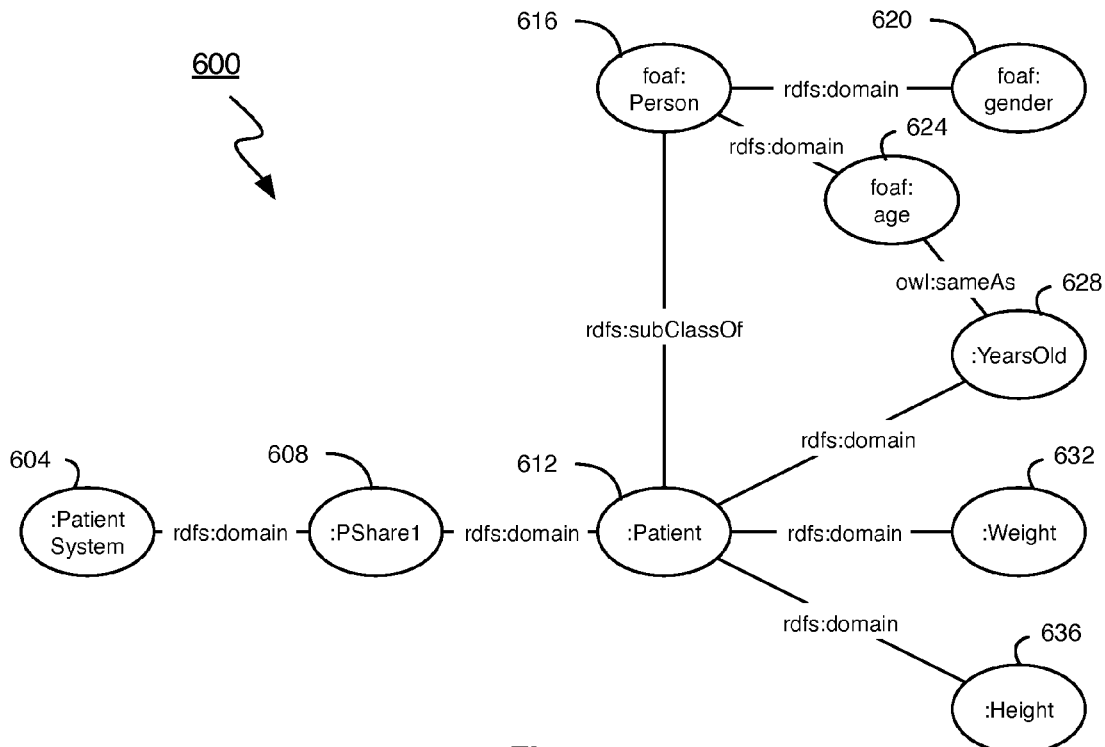
FIG. 7 illustrates a graph data structure definition for the data shared by the PatientSystem software system of FIG. 6.

FIG. 7 shows the graph data structure definition for the data items shared by PatientSystem 516A generally at 600. PatientSystem 516A is represented by a first node 604. As shown, PatientSystem 516A defines a set of values that it shares and gives that set the identifier PShare1 608. The PShare1 608 includes a patient, represented by Patient 612. Although it is not illustrated here, PatientSystem 516A could share other sets of values, giving each set its own identifier.

In order to enable flexibility in understanding the data provided by the PatientSystem 516A, a subclass is defined for Patient 612 called Person 616. Person 616 has two properties, gender 620 and age 624. Patient 612 also has three properties, YearsOld 628, Weight 632 and Height 636. Two properties, age 624 and YearsOld 628, are identified as referring to the same data using a formal semantic description.

The following table illustrates the "triples" that are used to define the graph data structure shown in FIG. 7:

| Subject | Predicate | Object | Description |
|---|---|---|---|
| :PShare1 | rdfs:domain | :PatientSystem | PShare1 is a property of PatientSystem |
| :Patient | rdfs:domain | :PShare1 | Patient is a property of PShare1 |
| :Patient | rdfs:subClassOf | foaf:Person | Patient is a subclass of Person |
| foaf:gender | rdfs:domain | foaf:Person | Gender is a property of Person |
| foaf:age | rdfs:domain | foaf:Person | age is a property of Person |
| :YearsOld | rdfs:domain | :Patient | YearsOld is a property of Patient |
| :YearsOld | owl:sameAs | foaf:age | YearsOld represents the same property as foaf:age |
| :Weight | rdfs:domain | :Patient | Weight is a property of Patient |
| :Height | rdfs:domain | :Patient | Height is a property of Patient |

As will be noted, the following predicates are used in the triples:

rdfs:domain: this indicates that the object is a property of the subject rdfs:subClassOf: this indicates that the subject is a subclass of the object; that is, that members of the subject class are also members of the object class owl:sameAs: this indicates that the members of the object class are the same as the members of the subject class rdf:type: this indicates that the subject is an instance of the object The first part of each of these triples is a prefix used as a short form for the rest of the URI. There are five prefixes used: "rdfs:", "rdf:", ":", "owl:" and "foaf:". Each of these prefixes can refer to a different URI prefix. When combined with the suffix, they form a full, unambiguous and unique URI.

As noted above, a "Patient" is a subclass of "Person". In this manner, properties of a person can be equivocated with properties of a patient. Additionally, "YearsOld" and "age" represent the same property, even though the identifier of the two data items differs.

This enables reference to the same predicate in the shared value space 112 using either the predicate identifier ":YearsOld" or the predicate identifier "foaf:age".

In addition, at registration, PatientSystem 516A also communicates two consume requests: one for the BMI and one for the risk factor. The structure for these two consume requests is presented below:

| Consume Request Identifier | Standing Query | Address |
|---|---|---|
| :PatientSystem#CR1 | CONSTRUCT { ?source :BMI ?bmivalue.} WHERE {?source :BMI ?bmivalue;} | &pfunc1; |
| :PatientSystem#CR2 | CONSTRUCT { ?source :Risk ?riskvalue.} WHERE {?source :Risk ?riskvalue;} | &pfunc2; |

Each consume request has a unique identifier for the request and the standing query that the shared value manager 104 executes to determine if the consume request is satisfied. The first consume request in the table has an identifier of ":PatientSystem#CR1". It requests a triple that provides the current value of the ":BMI" data item regardless of the subject it is related to. Associated with that consume request is the address of a function "&pfunc1" within PatientSystem 516A that should be notified when the first consume request is satisfied. The second consume request with an identifier of ":PatientSystem#CR2" requests a triple that provides the current value of the ":Risk" data item regardless of the subject it is related to. Associated with the second consume request is the address of a function "&pfunc2" within PatientSystem 516A that should be notified when the second consume request is satisfied.

Figure 8:
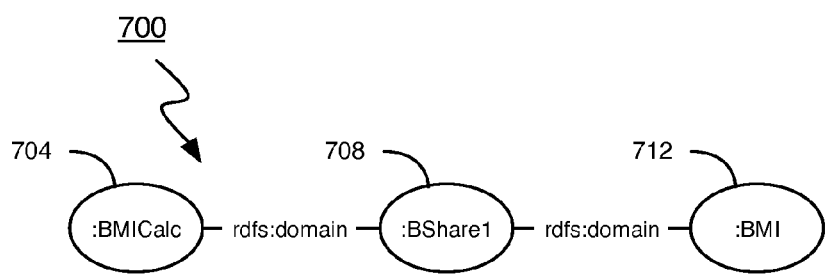
FIG. 8 illustrates a graph data structure definition for the data shared by the BMICalc software system of FIG. 6.

FIG. 8 shows the graph data structure definition for the data items shared by BMICalc 516B generally at 700. BMICalc 516B is represented by a first node 704. As shown, BMICalc 516B defines a set of values that it shares and gives that set the identifier BShare1 708. The BShare1 708 has a property of BMI 712.

The following table illustrates the triples that are used to define the graph data structure shown in FIG. 8:

| Subject | Predicate | Object | Description |
|---|---|---|---|
| :BShare1 | rdfs:domain | :BMICalc | BShare1 is a property of BMICalc |
| :BMI | rdfs:domain | :BShare1 | BMI is a property of BShare1 |

In addition, at registration, BMICalc 516B also communicates a consume request for a person's height and weight. The structure for this consume request is presented below:

| Consume Request Identifier | Standing Query | Address |
|---|---|---|
| :BMICalc#CR1 | CONSTRUCT { ?pheight :Height ?person. ?pweight :Weight?person. } WHERE { ?person a foaf:Person; ?pweight :Weight ?person; ?pheight :Height ?person; } | onHeightWeight |

The single consume request defined by BMICalc 516B is identified as ":BMICalc#CR1". The standing query returns the current value of both the height and weight where they are both related to the same instance of a "foaf:Person". Associated with that consume request is the address of a JavaScript function "on HeightWeight" within BMICalc 516B that should be notified when the consume request is satisfied. BMICalc 516B has been written to be a general client, it requests to consume the weight and height of a person. This definition is explicit enough to exclude invalid values, it includes a person so that, if paired with a shipping system, BMICalc 516B would not try to calculate the BMI of a box just because the shipping system shared the ":Weight" and ":Height" values of a box. Since BMICalc 516B wasn't written specifically to work with PatientSystem 516A, it does not look for a ":Patient" and, instead, looks for a "foaf:Person". The semantic definition of the ":Patient" data type includes the definition that ":Patient" is a subclass of "foaf:Person" and that makes this consume request match the data item shared by PatientSystem 516A. During execution of the standing query by the query evaluator, a process, generally called reasoning, is carried out by the reasoner module, wherein the data requested in the standing query is semantically resolved to data item values in the shared value space 112 using the semantics described with the graph data structure description for the software system 116. It is this reasoning process that is able to use the subclass relationship from ":Patient" to "foaf:Person" to make connections that are not exact matches.

Figure 9:
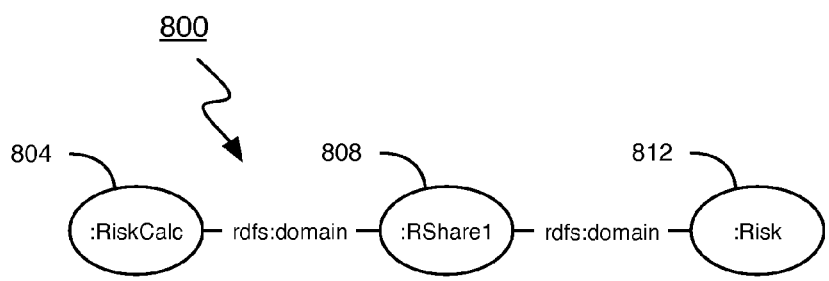
FIG. 9 illustrates a graph data structure definition for the data shared by the RiskCalc software system of FIG. 6.

FIG. 9 shows the graph data structure definition for the data items shared by RiskCalc 516C generally at 800. RiskCalc 516C is represented by a first node 804. As shown, RiskCalc 516C defines a set of values that it shares and gives that set the identifier RShare1 808. The RShare1 808 has a property of Risk 812.

The following table illustrates the triples that are used to define the graph data structure shown in FIG. 9:

| Subject | Predicate | Object | Description |
|---|---|---|---|
| :RShare1 | rdfs:domain | :RiskCalc | RShare1 is a property of RiskCalc |
| :Risk | rdfs:domain | :RShare1 | Risk is a property of RShare1 |

In addition, at registration, RiskCalc 516C also communicates a consume request for each of a person's gender, age and BMI. The structure for this consume request is presented below:

| Consume Request Identifier | Standing Query | Address |
|---|---|---|
| :RiskCalc#CR1 | CONSTRUCT<br>{<br>  ?pgender foaf:gender ?person.<br>  ?page foaf:age ?person.<br>  ?pbmi :BMI ?source.<br>}<br>WHERE<br>{<br>  ?patient a foaf:Person;<br>  ?pgender foaf:gender ?person;<br>  ?page foaf:age ?person;<br>  ?source :BMI ?bmivalue;<br>} | http://example.com/<br>riskservice.asmx |

The single consume request defined by RiskCalc 516C is identified as ":RiskCalc#CR1". The standing query returns the current value of the gender and age where they are both related to the same instance of a "foaf:Person", it also returns the current value of the ":BMI" data item. Associated with that consume request is the address of a web service "http://example.com/riskservice.asmx" for RiskCalc 516C that should be notified when the consume request is satisfied. RiskCalc 516C relies on the same "foaf:Person" abstraction to have the query evaluator find its information and the semantics make the same connection to enable semantic resolution to a ":Patient". Because RiskCalc 516C is using "foaf:Person" concepts, it does not know about ":YearsOld" and, as a result, the request for the "foaf:age" does not have an exact match in any of the shared information. A human looking at the information shared would recognize that the value ":Patient:YearsOld" is the same concept as "foaf:age"; because of the semantic description of the data, the query evaluator can find the same relationship. The connection is defined semantically using the "owl:sameAs" predicate so that the reasoner module can process the relationship between them.

Data sharing between the various components of the exemplary scenario of FIG. 6 will now be described with reference to FIGS. 1 to 15. The data sharing is initiated as a result of a user selecting a patient in PatientSystem 516A. For purposes of this example, it is assumed that PatientSystem 516A, BMICalc 516B and RiskCalc 516C have all previously registered with the stateful data sharing service 100. It will be understood, however, that this need not be the case.

Figure 10:
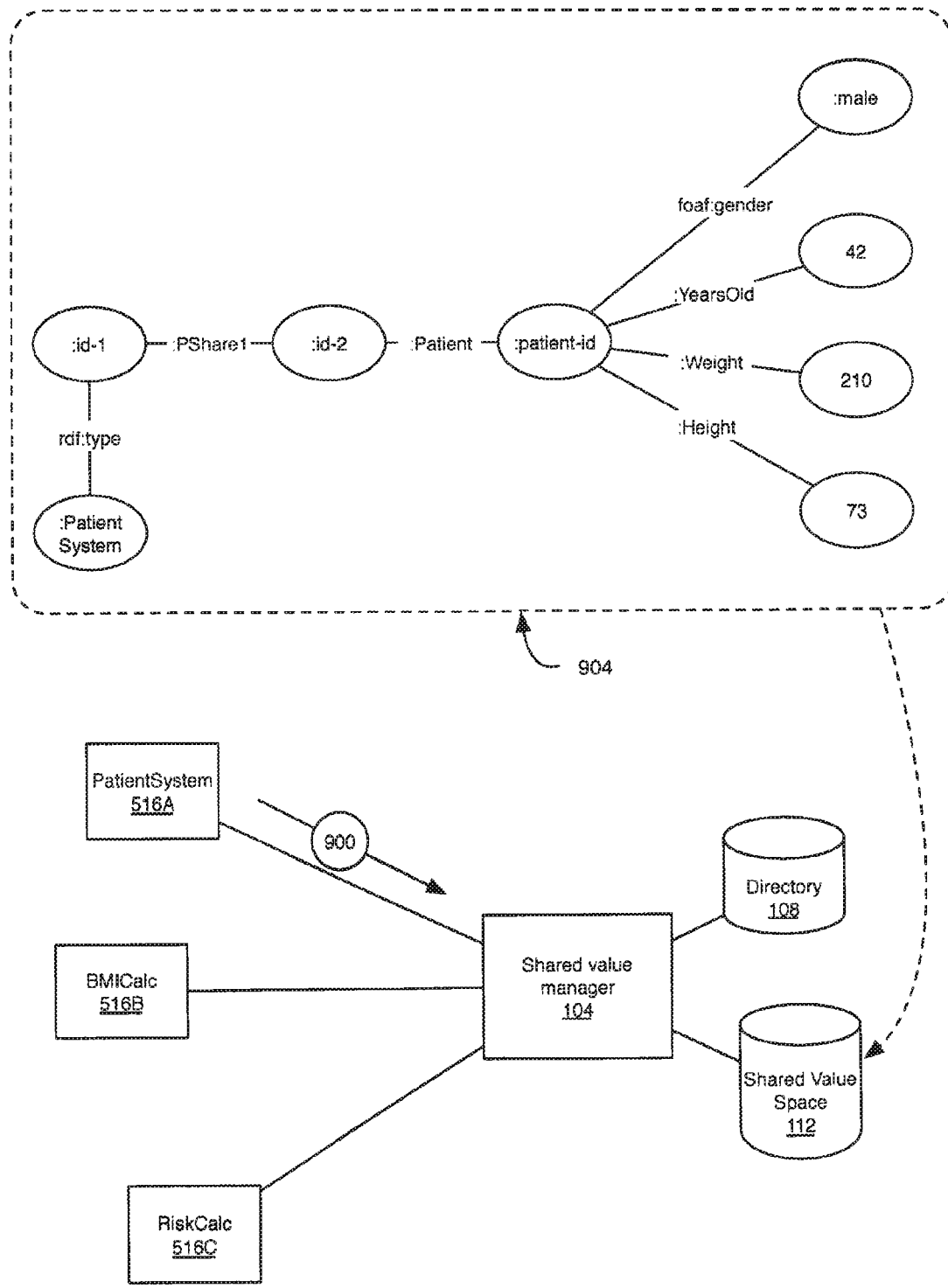
FIG. 10 shows the data item values being shared by the PatientSystem software system of FIG. 6.

FIG. 10 shows PatientSystem 516A sending a communication 900 to the shared value manager 104 that includes a set of parameters, and a set of data item values provided as a set of triples. The parameters identify the instance of the software system type that PatientSystem 516A is and the type of share that PatientSystem 516A is providing. The set of triples sent by PatientSystem 516A are shown below, together with a description of what each triple states.

| Subject | Predicate | Object | Description |
|---|---|---|---|
| :patient-id | foaf:gender | male | patient-id has the gender "male" |
| :patient-id | :YearsOld | 42 | patient-id is "42" years old. |
| :patient-id | :Weight | 210 | patient-id has a weight of "210" |
| :patient-id | :Height | 73 | patient-id has a height of "73" |

Note that ":patient-id" is a non-private unique identifier in this example that is generated by PatientSystem 516A for external use. The shared value manager 104 generates identifiers for the instance of the software system type and the share at registration time. For illustration purposes, these values are "id-1" and "id-2" respectively.

In addition, the graph data structure 904 that the shared value manager 104 generates in the shared value space 112 as a result of receiving the parameters and shared data item values from PatientSystem 516A is shown. As will be appreciated, PatientSystem 516A has shared a patient that is male, is 42 years old, a weight of 210 pounds and a height of 73 inches.

Upon receiving the data item values, the shared value manager 104 executes the methods 300 and 400. As a result, the shared value manager 104 determines that the consume request submitted by BMICalc 516B has been satisfied.

Figure 11:
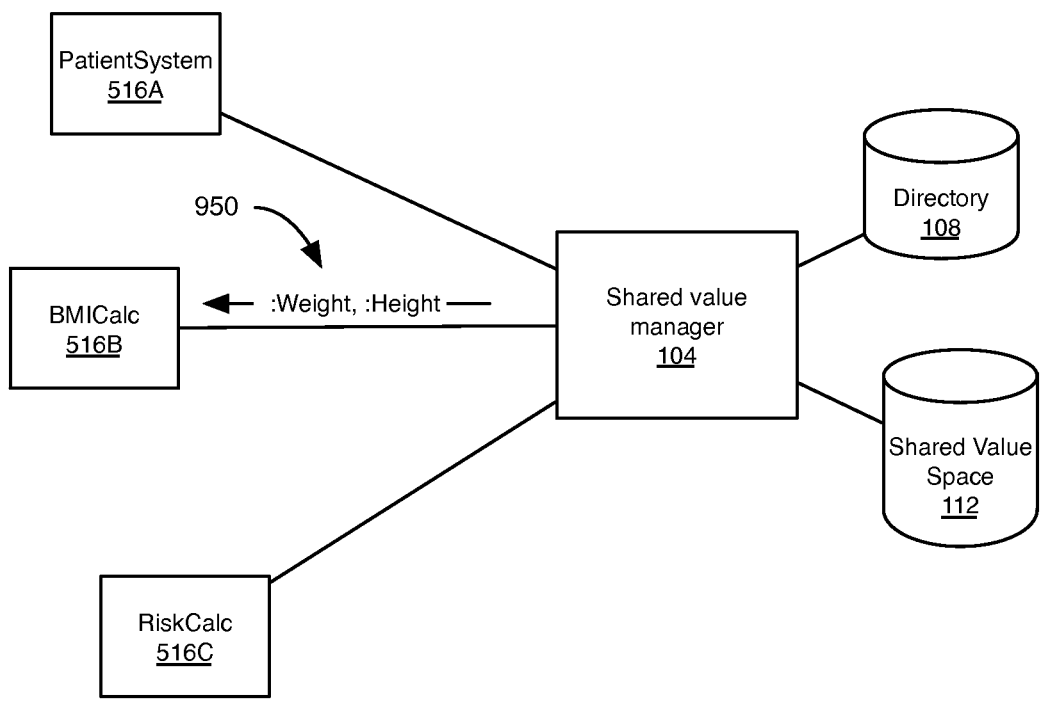
FIG. 11 shows the shared value manager fulfilling consume requests of the BMICalc software system of FIG. 6.

FIG. 11 shows the shared value manager 104 fulfilling the consume request of BMICalc 516B by making a call 950 to the address identified in the consume request to BMICalc with the ":Height" and ":Weight" data item values provided by PatientSystem 516A as parameters, as well as the version identification for the transaction to which they belong.

BMICalc 516B is configured such that, upon receiving a height and weight, it calculates a BMI, which BMICalc 516B has indicated it would share with the stateful data sharing service 100.

Figure 12:
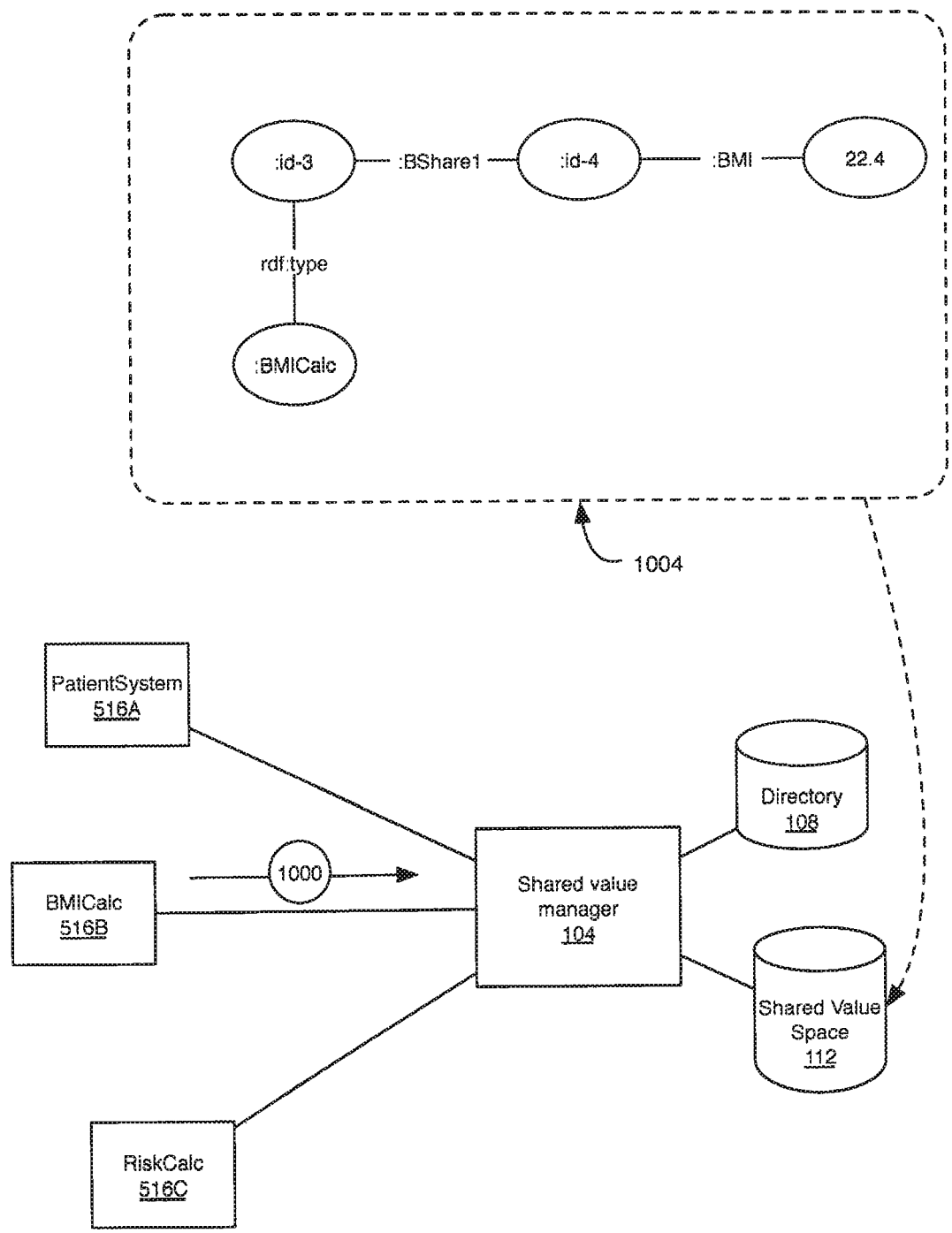
FIG. 12 shows the data item values being shared by the BMICalc software system of FIG. 6.

FIG. 12 shows the BMICalc 516B sending a communication 1000 to the shared value manager 104 that includes a set of parameters, and a data item value provided as a single triple. The parameters identify the instance of the software system type that BMICalc 516B is, the type of share that BMICalc 516B is providing and the version identification for the version it relied on in calculating the BMI. The triple sent by BMICalc 516B is shown below, together with a description of what the triple states.

| Subject | Predicate | Object | Description |
| --- | --- | --- | --- |
| :patient-id | :BMI | 22.4 | :patient-id has a BMI of "22.4" |

Note that the above-identified triple indicates that BMICalc 516B knows ":patient-id", which it received in the satisfied consume request notification. As noted previously, "patient-id" is not private information.

In addition, the graph data structure 1004 that the shared value manager 104 generates in the shared value space 112 as a result of receiving the parameters and the shared data item value from BMICalc 516B is shown. As will be appreciated, BMICalc 516B has shared the calculated ":BMI" value of "22.4".

Upon receiving the ":BMI" value, the shared value manager 104 executes the methods 300 and 400. As a result of receiving this shared value and maintaining the persistent state of the previously-shared values from PatientSystem 516A, the shared value manager 104 determines that the consume request submitted by RiskCalc 516C has been satisfied.

Figure 13:
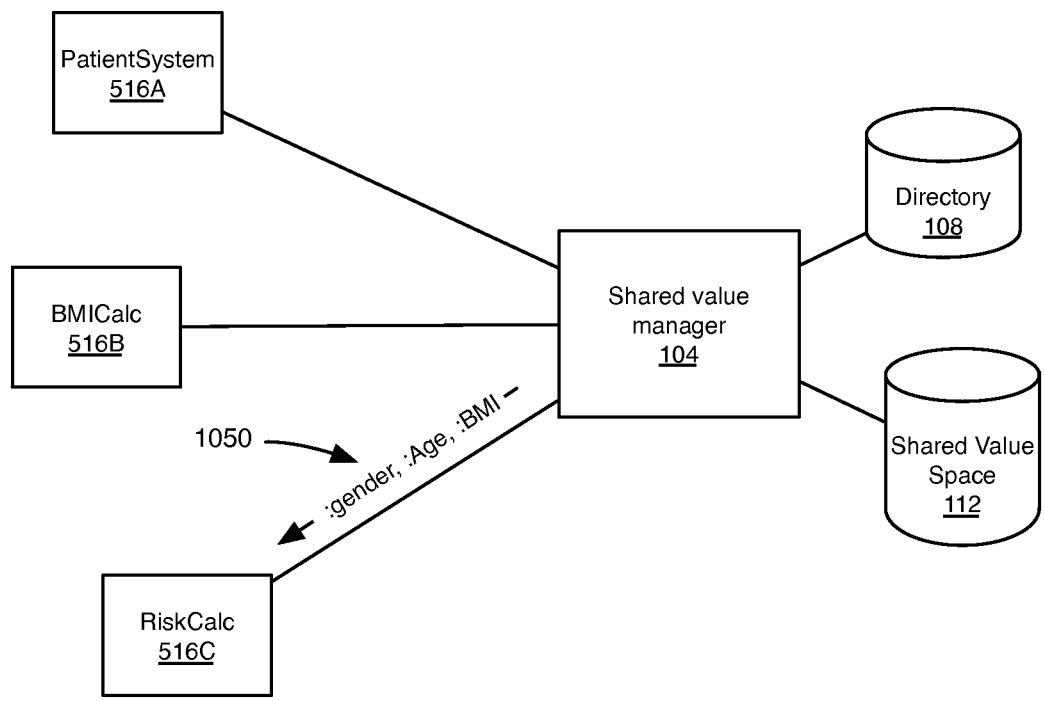
FIG. 13 shows the shared value manager fulfilling consume requests of the RiskCalc software system of FIG. 6.

FIG. 13 shows the shared value manager 104 fulfilling the consume request of RiskCalc 516C by making a call 1050 to the address identified in the consume request to RiskCalc 516C with the "foaf:age" and "foaf:gender" data item values provided by PatientSystem 516A and the ":BMI" data item value provided by BMICalc 516B as parameters, as well as the current version identification.

RiskCalc 516C is configured such that, upon receiving an age, gender and BMI, it calculates a risk factor, ":Risk", which RiskCalc 516C has indicated it would share with the stateful data sharing service 100.

Figure 14:
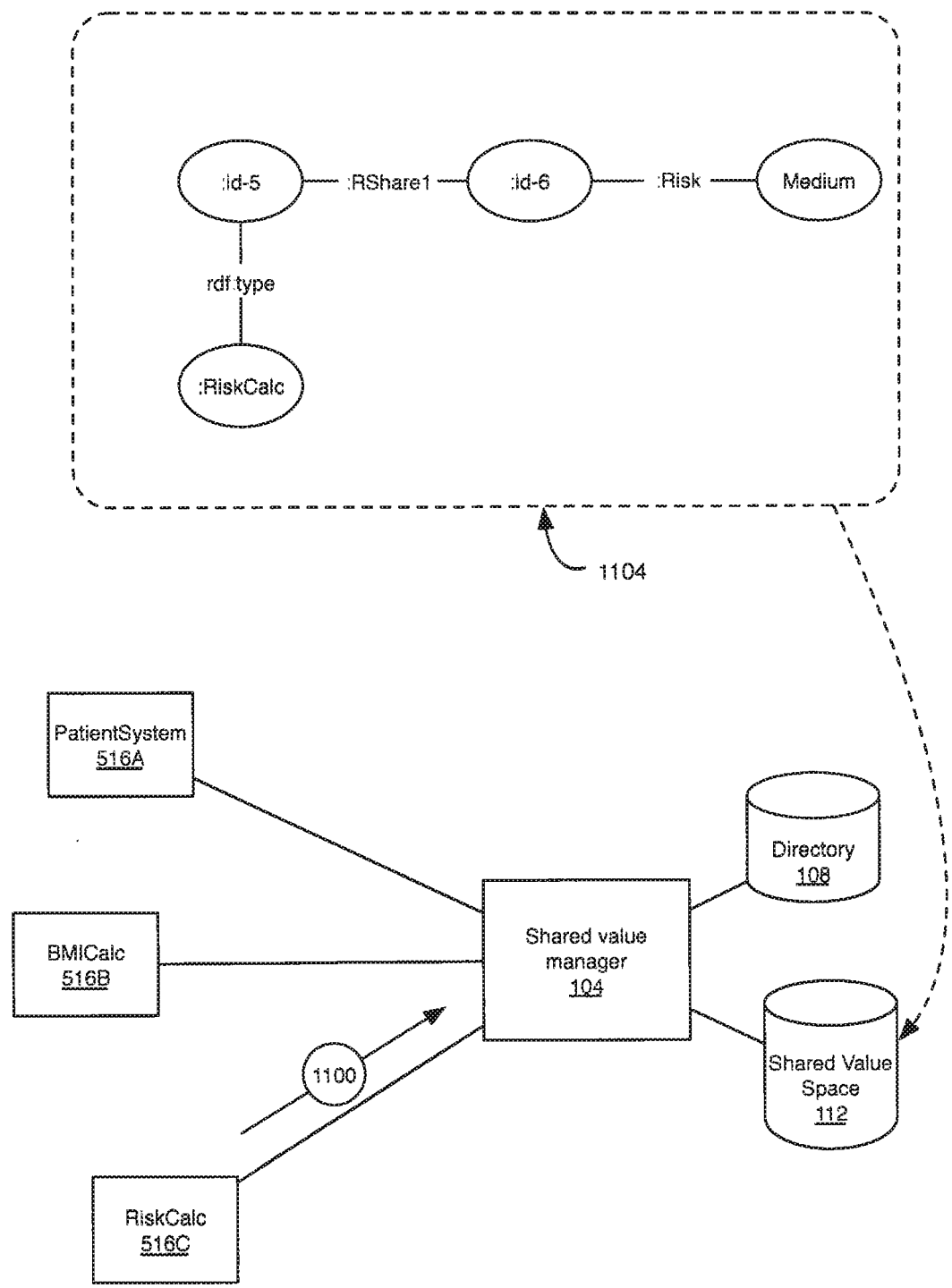
FIG. 14 shows the data item values being shared by the RiskCalc software system of FIG. 6.

FIG. 14 shows RiskCalc 516C sending a communication 1100 to the shared value manager 104 that includes a set of parameters, and a data item value provided as a single triple. The parameters identify the instance of the software system type that RiskCalc 516C is, the type of share that RiskCalc 516C is providing and the version identification for the version it relied on in calculating the Risk. The set of triples sent by RiskCalc 516C are shown below, together with a description of what the triple states.

| Subject | Predicate | Object | Description |
| --- | --- | --- | --- |
| :patient-id | :Risk | Medium | id-4 has a risk factor of "Medium" |

Note that, while the above-identified triple indicates that RiskCalc 516C knows ":patient-id", which it received in the satisfied consume request notification. As noted previously, "patient-id" is not private information.

In addition, the graph data structure 1104 that the shared value manager 104 generates in the shared value space 112 as a result of receiving the parameters and the shared data item value from RiskCalc 516C is shown. As will be appreciated, RiskCalc 516C has shared a ":Risk" data item value of "Medium".

Upon receiving the ":Risk" value, the shared value manager 104 executes the methods 300 and 400. As a result, the shared value manager 104 determines that the consume request submitted by PatientSystem 516A has been satisfied.

Figure 15:
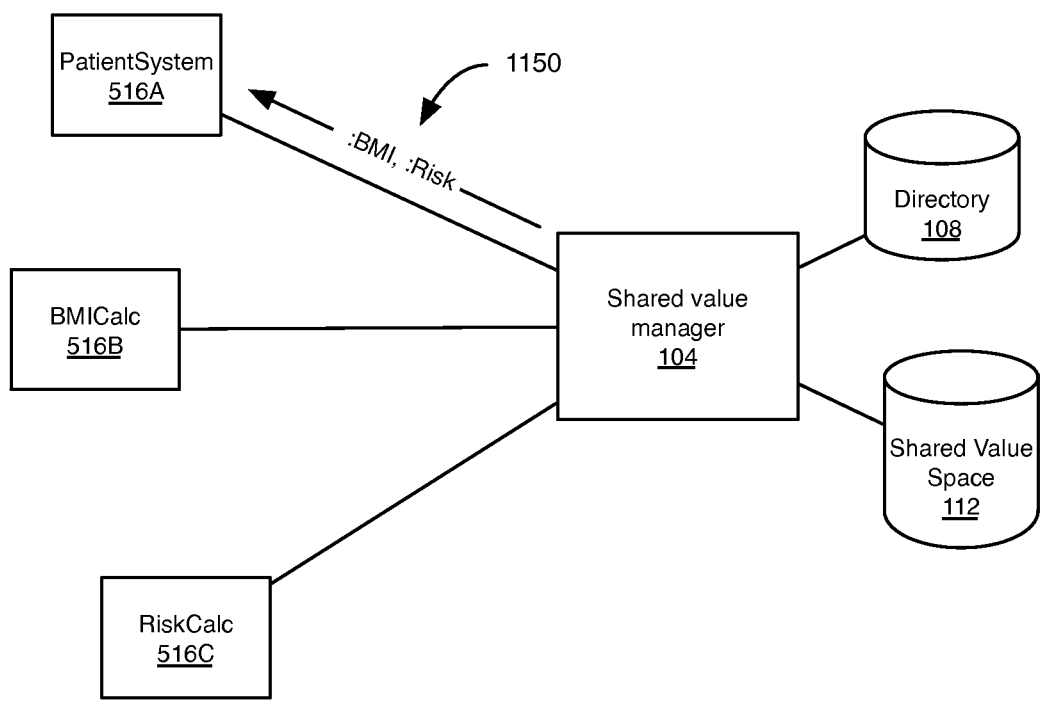
FIG. 15 shows the shared value manager fulfilling consume requests of the PatientSystem software system of FIG. 6.

FIG. 15 shows the shared value manager 104 fulfilling the consume request of PatientSystem 516A by making a call 1150 to the address identified in the consume request to PatientSystem 516A with the ":BMI" data item value provided by BMICalc 516B and the ":Risk" data item value provided by RiskCalc 516C as parameters, as well as the version identification.

PatientSystem 516A is configured such that, upon receiving the ":BMI" and ":Risk" data item values, it presents the information to a user on a display. The receipt of these values by PatientSystem 516A completes the transaction.

Thus, the stateful data sharing service 100 enables sharing data between software systems using generally persistent information with shared semantics. As the integration is not point-to-point and provides persistence of shared data after it is provided, it allows more than two software systems to asynchronously share data. Both the shared data and the shared semantics can be made persistent and externalized from the software systems. The stateful data sharing service 100 orchestrates transactions by simply storing requests for data, and responding to the requests when values for data items that semantically match the requested data are available, making such transactions data-driven.

Computer-executable instructions for implementing the stateful data sharing service on a computer system could be provided separately from the computer system, for example, on a computer-readable medium (such as, for example, an optical disk, a hard disk, a USB drive or a media card) or by making them available for downloading over a communications network, such as the Internet. The computer-executable instructions could be bundled with one or more software systems. For example, visiting a website that includes software system functionality could trigger a download event for the computer-executable instructions.

While the invention has been described with specificity to a JAVA® programming language implementation, other types of implementations will occur to those of skill in the art. For example, the stateful data sharing service could be written in any one of a number of programming languages, such as Microsoft's C# or Javascript. Any general purpose programming language could be substituted.

Instead of processing all consume requests each time data values are changed, it may be desirable in some circumstances to determine which consume requests are or may be applicable based on the semantic information. In another alternative configuration, all consume requests can be processed independent of the receipt of data item values at a somewhat regular frequency, such as every 100 milliseconds.

Instead of storing graph data structure definitions and standing queries in the directory persistently, the software systems can provide this information as required, such as during registration.

The web interface for receiving requests could be substituted with any of a variety of interfaces, thus replacing the HTTP used with any communication protocol, such as JAVA® Remote Method Invocation, .NET Windows Communication Framework, Message queue style communications or even simple function calls.

RDF can be replaced as the metadata format by other types of metadata languages such as, for example, DAML, and XML.

SPARQL is only one possible query language for use in constructing standing queries. Other examples include XsRQL and RQL.

While the computer system is shown as a single physical computer, it will be appreciated that the computer system can include two or more physical computers in communication with each other. Accordingly, while the embodiment shows the various components of the stateful data sharing service residing on the same physical computer, those skilled in the art will appreciate that the components can reside on separate physical computers. Further, any or all of the components of the stateful data sharing service can reside on a separate physical computer from the software systems.

The shared value manager can maintain separate transactions in the shared value space or can create separate shared value spaces for each type of transaction.

The software systems could be either visual or non-visual, examples of clients systems include: web pages, rich web applications, client software like Microsoft Excel, SOA endpoints, Databases, JavaScript scripts, etc.

The addresses provided with consume requests can alternatively be address pointers, TCP/IP sockets, message channels or any other means of communicating with the software systems.

While a value update queue is used in the above-described embodiment, other methods of processing sets of data item values could be used. For example, alternative methods include the use of an exclusive lock, parallel execution with exclusive data spaces or any other method that ensures a consistent end-state for the shared value space after update.

Any identifier that provides uniqueness within the referenceable address space would work in place of URIs. For example, an integer or a Globally Unique Identifier ("GUID") could be employed.

The stateful data sharing service can augment the semantic information for the data items by integrating additional semantic definitions with the semantic descriptions of the shared data to provide enhanced processing. That is, additional semantic information relating the data items in the graph data structure to other data items can be added. For example, the stateful data sharing service can add a relationship between ":Person" defined in the exemplary graph data structure definition of FIG. 7 and a data item called ":Individual" using the "rdfs:subClassOf" descriptor. In this manner, the stateful data sharing service could semantically resolve a request for the age of an individual using the data shared by PatientSystem.

The description of the software systems can be provided separate from the registration requests. This information could be provided as a separate step and the directory could already be populated at the time of registration. The directory could be persistent across multiple shared value manager instances and sessions.

The standing requests can be semantically resolved to data items as part of a pre-processing stage for the standing requests, in some cases.

Values held in the shared value manager can be as persistent as desired by the implementer and the software systems. Values can be held persistently even when the shared value manager is not executing or, alternately, could have lifetimes much shorter than the life of a single client. In one alternative configuration, values can be assigned a "time-to-live" property that indicates the length of the time period during which the values are valid. In this case, each value is either replaced with a subsequently-shared value or is discarded after the specified time period.

Data translator software systems can be employed with the invention. For example, if a first software system contributes a value to the shared information set that a second software system doesn't understand, a third software system could interpret the value to allow the second software system to process it.

Although shared data item values corresponding to outdated transactions are discarded in the embodiment described above, the stateful data sharing service could store data item values corresponding to different transactions simultaneously.

The software systems could repeatedly attempt to register with the stateful data sharing service if it was not active at the first attempt. Alternatively, they could cause the stateful data sharing service to initialize if is not active.

Other types of data item identifiers will occur to those skilled in the art.

The shared value manager could be started on demand instead of at the start-up of the computer system.

The above-described embodiments are intended to be examples of the present invention and alterations and modifications may be effected thereto, by those of skill in the art, without departing from the scope of the invention that is defined solely by the claims appended hereto.

What is claimed is:

1. A method for sharing data between software systems, comprising:
    maintaining a graph data structure in storage of a computing device, said graph data structure having data items and relationships therebetween that are semantically described;
    storing a request received from a first software system for requested data that is semantically described, and an address declared by said first software system;
    detecting whenever at least one value of said data items in said graph data structure is updated: and
    if an update to at least one value of said data items in said graph data structure is detected:
        semantically resolving said requested data to a set of said data items in said graph data structure; and
        passing changes to values of said set of said data items to which said requested data semantically resolves to said first software system at said address.

2. The method of claim 1, further comprising:
    receiving at least one updated value for said data items in said graph data structure from a second software system.

3. The method of claim 2, further comprising:
    updating said graph data structure with said at least one updated value if said at least one updated value corresponds to a current transaction.

4. The method of claim 3, further comprising:
    discarding said at least one updated value of said data items if said at least one updated value corresponds to an outdated transaction.

5. The method of claim 1, further comprising:
    deleting said stored request received from said first software system if said first software system becomes inactive.

6. A computer system for sharing data between software systems, comprising:
    a data sharing service executing on said computer system, said data sharing service storing a graph data structure in which data items and relationships therebetween are semantically described, said data sharing service storing a request received from a first software system for requested data that is semantically described, and an address for said first software system, detecting whenever at least one value of said data items in said graph data structure is updated, and, if an update to at least one value of said data items in said graph data structure is detected, said data sharing service semantically resolving said requested data to a set of said data items in said graph data structure and passing changes to values of said set of said data items to which said requested data semantically resolves to said first software system at said address.

7. The computer system of claim 6, wherein said data sharing service has an interface for receiving at least one updated value for said data items in said graph data structure from a second software system.

8. The computer system of claim 7, wherein said data sharing service updates said graph data structure with said at least one updated value if said at least one updated value corresponds to a current transaction.

9. The computer system of claim 8, wherein said data sharing service discards said at least one updated value of said data items if said at least one updated value corresponds to an outdated transaction.

10. The computer system of claim 6, wherein said data sharing service deletes said request received from said first software system if said first software system becomes inactive.

11. A method for sharing data between software systems, comprising:
  storing values for data items received from software systems in storage of a computer system, said data items and relationships therebetween being semantically described;
  storing requests received from said software systems in said storage, each of said requests identifying requested data semantically and including an address;
  detecting whenever at least one of said values of said data items in said graph data structure is updated; and
  if an update to at least one value of said data items in said graph data structure is detected:
    semantically resolving said requested data for each of a subset of said requests to a set of said data items via said computer system; and
    passing, for each of said requests in said subset, changes to said values of said set of said data items to which said requested data semantically resolves to said address identified in said request.

12. The method of claim 11, further comprising:
receiving at least one updated value for said data items from one of said software systems.

13. The method of claim 12, further comprising:
storing said at least one updated value if said at least one updated value corresponds to a current transaction.

14. The method of claim 13, further comprising:
discarding said at least one updated value if said at least one updated value corresponds to an outdated transaction.

15. The method of claim 11, further comprising:
adding semantic information relating said data items to other data items.

16. A computer system for sharing data between software systems, comprising:
  a data sharing service executing on said computer system, said data sharing service storing values for data items received from software systems in storage, said data items and relationships therebetween being semantically described, said data sharing service storing requests received from said software systems, each of said requests identifying requested data semantically and including an address, detecting whenever at least one of said values of said data items in said graph data structure is updated, and, if an update to at least one value of said data items in said graph data structure is detected, said data sharing service semantically resolving said requested data for each of a subset of said requests to a set of said data items and passing, for at least one of said requests in said subset, changes to said values of said set of said data items to which said requested data semantically resolves to said address identified in said request.

17. The computer system of claim 16, wherein said data sharing service includes an interface for receiving at least one updated value for said data items from one of said software systems.

18. The computer system of claim 17, wherein said data sharing service stores said at least one updated value if said at least one updated value corresponds to a current transaction.

19. The computer system of claim 17, wherein said data sharing service discards said at least one updated value if said at least one updated value corresponds to an outdated transaction.

20. The computer system of claim 18, wherein said data sharing service determines which of said requests semantically resolve to said sets of said data items as a result of storing said at least one updated value.

21. The computer system of claim 16, wherein said data sharing service adds semantic information relating said data items to other data items.

22. A non-transitory computer-readable medium having stored thereon computer-executable instructions implementing a data sharing service when executed on a computer system, said data sharing service storing values for data items received from software systems in storage, said data items and relationships therebetween being semantically described, said data sharing service storing requests received from said software systems, each of said requests identifying requested data semantically and including an address, detecting whenever at least one of said values of said data items in said graph data structure is updated, and, if an update to at least one value of said data items in said graph data structure is detected, said data sharing service semantically resolving said requested data for each of a subset of said requests to a set of said data items, and passing, for at least one of said requests in said subset, changes to said values of said set of said data items to which said requested data semantically resolves to said address identified in said request.

23. A method for sharing data between software systems, comprising:
  storing values received from software systems in storage of a computer system, said values being for data items in a graph data structure having relationships therebetween being semantically described;
  storing requests received from said software systems in said storage, each of said requests identifying requested data semantically;
  semantically resolving said requested data for each of a subset of said requests to a set of said data items via said computer system;
  updating at least one value of said data items in said graph data structure; and
  communicating, for each of said requests in said subset, changes to said values of said set of said data items to which said requested data semantically resolves to said software system that made said request whenever at least one of said values of said data items in said graph data structure is updated.

24. The method of claim 23, wherein said communicating comprises communicating, for each of said requests in said subset for which changes in said values of said sets of said data items to which said requests semantically resolve occurred, said values for each of said data items in said set to said software system that made said request whenever at least one of said values of said data items is updated.

25. The method of claim 23, further comprising:
receiving at least one updated value for said data item from another of said software systems;
storing said at least one updated value if said at least one updated value corresponds to a current transaction; and
discarding said at least one updated value if said at least one updated value corresponds to an outdated transaction.

26. The method of claim 23, further comprising:
storing graph data structure definitions for a set of software system types; and
registering each said software system if said software system is associated with one of said graph data structure definitions.

27. The method of claim 26, wherein said storing of each of said values for said data items is performed if said data item is enumerated in said graph data structure definition associated with said software system from which said value is received.

28. A computer system for sharing data between software systems, comprising:
a data sharing service executing on said computer system, said data sharing service storing values received from software systems in storage, said values being for data items in a graph data structure having relationships therebetween being semantically described, said data sharing service storing requests received from said software systems, each of said requests identifying requested data semantically, said data sharing service semantically resolving said requested data for each of a subset of said requests to a set of said data items, updating at least one value of said data items in said graph data structure, and communicating, for each of said requests in said subset, changes to said values of said set of said data items to which said requested data for said request semantically resolves to said software system that made said request whenever at least one of said values of said data items in said graph data structure is updated.

29. The computer system of claim 28, wherein said data sharing service communicates, for each of said requests in said subset for which changes in said values of said sets of said data items to which said requests semantically resolve occurred, said values for each of said data items in said set to said software system that made said request whenever said at least one value of said data items is updated.

30. The computer system of claim 28, wherein said data sharing service receives at least one updated value for said data items from another of said software systems, stores said at least one updated value if said at least one updated value corresponds to a current transaction, and discards said at least one updated value if said at least one updated value corresponds to an outdated transaction.

31. The computer system of claim 28, wherein said data sharing service stores graph data structure definitions for a set of software system types, and registers each said software system if said software system is associated with one of said graph data structure definitions.

32. The computer system of claim 31, wherein said data sharing service stores each of said values for said data items if said data item is enumerated in said graph data structure definition associated with said software system from which said value is received.

33. A method for sharing data between software systems, comprising:
maintaining a graph data structure in storage of a computer system, said graph data structure having data items and relationships therebetween that are semantically described;
storing, in said storage, a request received from a first software system for requested data that is semantically described, and an address declared by said first software system;
semantically resolving said requested data to a set of said data items in said graph data structure via said computer system;
updating at least one value of said data items in said graph data structure; and
passing changes to values of said set of said data items to which said requested data semantically resolves to said first software system at said address every time at least one value of said data items in said graph data structure is updated.

34. A method for sharing data between software systems, comprising:
storing values for data items received from software systems in storage of a computer system, said data items and relationships therebetween being semantically described;
storing requests received from said software systems in said storage, each of said requests identifying requested data semantically;
semantically resolving said requested data for each of a subset of said requests to a set of said data items;
updating at least one value of said data items in said graph data structure; and
communicating changes to said values of said set of said data items to which said requested data for one of said requests in said subset semantically resolves to said software system that made said one request when said at least one value of said data items in said graph data structure is updated.

35. A method for sharing data between software systems, comprising:
storing requests generated by software systems in storage of a computer system, each said request identifying a query for requested data;
semantically resolving, via said computer system, each of a subset of said queries to values for a set of data items in a graph data structure with semantically described relationships therebetween received from said software systems by said computer system; and
whenever at least one of said values of said set of data items in said graph data structure is updated:
passing, for each of said queries in said subset via said computer system, changes to said at least one updated value to said software system that generated said request identifying said query.

36. The method of claim 35, further comprising:
identifying said subset of said requests potentially affected by said at least one updated value prior to said semantically resolving.

37. The method of claim 35, wherein said subset comprises all of said requests.

* * * * *